US012560805B2

(12) United States Patent
Suzuki et al.

(10) Patent No.:  US 12,560,805 B2
(45) Date of Patent:      Feb. 24, 2026

(54) MOTORIZED CORRECTION COLLAR SYSTEM, METHOD OF CORRECTION COLLAR CALIBRATION PERFORMED BY MOTORIZED CORRECTION COLLAR SYSTEM, AND COMPUTER READABLE MEDIUM

(71) Applicant: Evident Corporation, Nagano (JP)

(72) Inventors: Noriyuki Suzuki, Nagano (JP);
Takuma Kimura, Nagano (JP);
Takehiko Hayashi, Nagano (JP); Keita Kojima, Nagano (JP)

(73) Assignee: Evident Corporation, Nagano (JP)

( * ) Notice: Subject to any disclaimer, the term of this patent is extended or adjusted under 35 U.S.C. 154(b) by 429 days.

(21) Appl. No.: 18/084,960

(22) Filed: Dec. 20, 2022

(65) Prior Publication Data

US 2023/0296882 A1      Sep. 21, 2023

(30) Foreign Application Priority Data

Mar. 16, 2022      (JP) ................................. 2022-041276

(51) Int. Cl.
*G02B 21/32*          (2006.01)
*G02B 27/00*          (2006.01)
*G02B 27/14*          (2006.01)

(52) U.S. Cl.
CPC ....... *G02B 27/0068* (2013.01); *G02B 27/147* (2013.01)

(58) Field of Classification Search
CPC ....... G02B 21/248; G02B 21/32; G02B 21/02
See application file for complete search history.

(56) References Cited

U.S. PATENT DOCUMENTS

| | | | |
|---|---|---|---|
| 2005/0024718 A1* | 2/2005 | Sase ..................... | G02B 21/361 359/383 |
| 2008/0225416 A1 | 9/2008 | Harada et al. | |
| 2010/0033812 A1* | 2/2010 | Fomitchov ......... | G02B 27/0068 359/821 |
| 2016/0004061 A1* | 1/2016 | Hebiishi .............. | G02B 21/248 359/388 |

(Continued)

FOREIGN PATENT DOCUMENTS

| | | |
|---|---|---|
| JP | 2005017643 A | 1/2005 |
| JP | 2008-224992 A | 9/2008 |

(Continued)

OTHER PUBLICATIONS

Japanese Office Action dated May 27, 2025 received in 2022-041276.

*Primary Examiner* — Joseph P Martinez
(74) *Attorney, Agent, or Firm* — Scully, Scott, Murphy & Presser, P.C.

(57)          ABSTRACT

A motorized correction collar system includes: an attachment portion; a control unit that controls transmission of force to a correction collar ring of a first objective lens attached to the attachment portion; and a storage unit that stores calibration information at least for each type of objective lens with a correction collar. The control unit acquires calibration information corresponding to the first objective lens from among the calibration information stored in the storage unit, and calibrates the correction collar of the first objective lens based on the calibration information.

11 Claims, 23 Drawing Sheets

(56)               References Cited

U.S. PATENT DOCUMENTS

2018/0338079 A1    11/2018  Suzuki

FOREIGN PATENT DOCUMENTS

| JP | 2010518448 | A | 5/2010 |
| JP | 5523840 | B2 | 6/2014 |
| JP | 2018072272 | A | 5/2018 |
| JP | 2018194780 | A | 12/2018 |

* cited by examiner

1

100

100a

100b

200

220    CPU

230    MEM-
       ORY

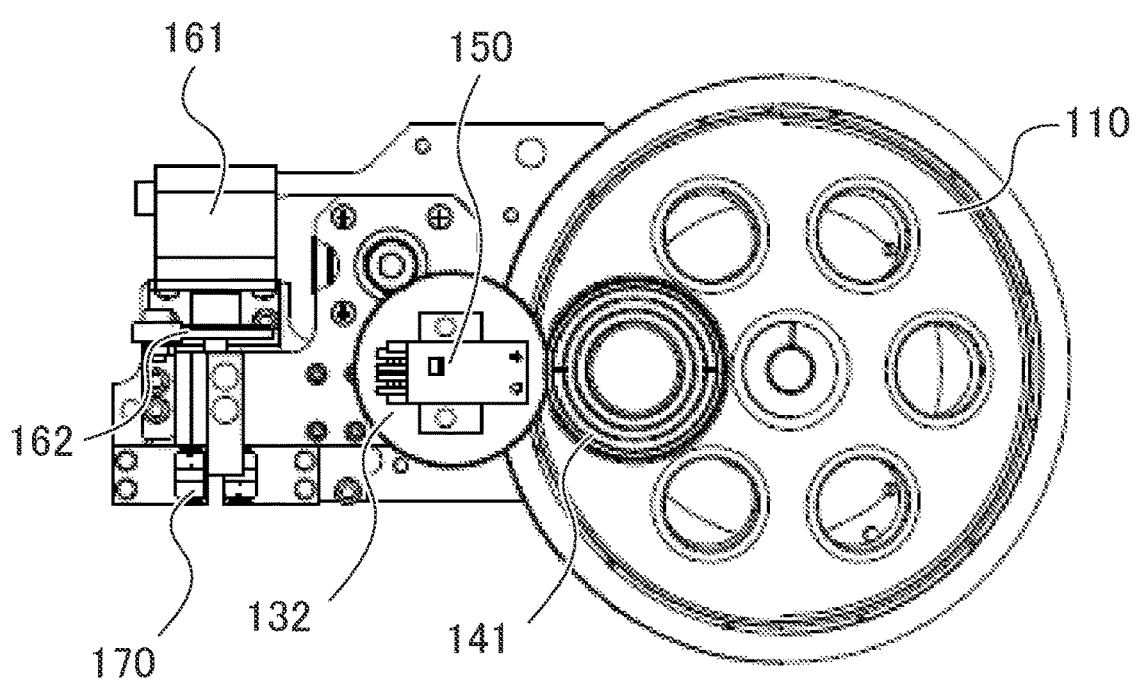
FIG. 6
FIG. 7

211

212

| Objective Type | UNDONE/DONE/– | CALIBRATION VALUE [°] |
|---|---|---|
| Objective A | — | — |
| Objective B | — | — |
| Objective C | — | — |
| Objective D | UNDONE | — |
| Objective E | DONE | α 1 |
| Objective F | DONE | α 2 |

20

0°                                                    360°

20

D                              E      F

| | UNDONE/DONE/– | CALIBRATION VALUE [°] |
|---|---|---|
| Objective A | – | – |
| Objective B | – | – |
| Objective C | – | – |
| Objective D | UNDONE | – |
| Objective E | DONE | (23°C)α 1 / (37°C)α 3 |
| Objective F | DONE | (23°C)α 2 / (37°C)α 4 |

| Objective Type | UNDONE/DONE/— | CALIBRATION VALUE [°] |
|---|---|---|
| Objective A | — | — |
| Objective B | — | — |
| Objective C | — | — |
| Objective D | UNDONE | — |
| Objective E | DONE | (CONTAINER 1)α 1 /(CONTAINER 2)α 5 |
| Objective F | DONE | (CONTAINER 1)α 2 /(CONTAINER 2)α 6 |

FIG. 30

| Objective Type | UNDONE/DONE/— | CALIBRATION VALUE [°] | MOVABLE RANGE [°] |
|---|---|---|---|
| Objective A | — | — | |
| Objective B | — | — | |
| Objective C | — | — | |
| Objective D | UNDONE | — | $\beta1\sim\beta2$ |
| Objective E | DONE | $\alpha1$ | $\beta3\sim\beta4$ |
| Objective F | DONE | $\alpha2$ | $\beta5\sim\beta6$ |

FIG. 32

| Objective Type | UNDONE/ DONE/– | CALIBRATION VALUE [°] | FOCUS ADJUSTMENT VALUE [um/deg] |
|---|---|---|---|
| Objective A | – | – | – |
| Objective B | – | – | – |
| Objective C | – | – | – |
| Objective D | UNDONE | – | 0.1 |
| Objective E | DONE | α 1 | 0.3 |
| Objective F | DONE | α 2 | 0.2 |

MOTORIZED CORRECTION COLLAR SYSTEM, METHOD OF CORRECTION COLLAR CALIBRATION PERFORMED BY MOTORIZED CORRECTION COLLAR SYSTEM, AND COMPUTER READABLE MEDIUM

CROSS REFERENCE TO RELATED APPLICATIONS

This application is based upon and claims the benefit of priority of the prior Japanese Patent Application No. 2022-041276, filed Mar. 16, 2022, the entire contents of which are incorporated herein by reference.

BACKGROUND OF THE INVENTION

Field of the Invention

The present specification relates to a motorized correction collar system, a method of correction collar calibration performed by the motorized correction collar system, and a computer-readable medium.

Description of the Related Art

Conventionally, a correction collar of a microscope system is used as a means for correcting a spherical aberration attributed to the thickness of a cover glass. In recent years, when a method for observing deep inside of a sample (for example, a biological sample) has been developed, a correction collar is also used for the purpose of correcting a spherical aberration that varies depending on the depth of an observation target plane.

There is a need for a motorized correction collar for various reasons such as structural restrictions of a microscope and improvement of workability of a user. A technique related to a motorized correction collar is described in, for example, JP 5523840 B2.

SUMMARY OF THE INVENTION

An motorized correction collar system according to an aspect of the present invention includes: an attachment portion to which an objective lens is attached; a processor that controls transmission of force to a correction collar ring of a first objective lens that is an objective lens attached to the attachment portion; and a memory that stores calibration information at least for each type of objective lens with a correction collar, in which the processor is configured to execute: first processing of acquiring first calibration information that is calibration information corresponding to the first objective lens from among calibration information stored in the memory; and second processing of calibrating a correction collar of the first objective lens based on the first calibration information.

A calibration method according to one aspect of the present invention is a method of correction collar calibration performed by the motorized correction collar system including the attachment portion to which the objective lens is attached, and the calibration method includes: acquiring the first calibration information that is calibration information corresponding to the first objective lens that is an objective lens attached to the attachment portion from among the calibration information stored at least for each type of objective lens with the correction collar; and controlling transmission of force to the correction collar ring of the first objective lens based on the first calibration information, to calibrate the correction collar of the first objective lens.

A computer-readable medium according to an aspect of the present invention is a non-transitory computer-readable medium storing a program for causing a computer of the motorized correction collar system including the attachment portion to which the objective lens is attached to execute processing of: acquiring first calibration information that is calibration information corresponding to the first objective lens that is an objective lens attached to the attachment portion from among the calibration information stored at least for each type of objective lens with the correction collar; and controlling transmission of force to the correction collar ring of the first objective lens based on the first calibration information, to calibrate the correction collar of the first objective lens.

BRIEF DESCRIPTION OF THE DRAWINGS

FIG. 1 is a diagram illustrating a configuration of a motorized correction collar system;

FIG. 6 is a top view of the motorized correction collar mechanism in a state in which the objective lens is removed;

FIG. 7 is a side view of the motorized correction collar mechanism in a state in which the objective lens is removed;

FIG. 30 is a diagram illustrating further another example of the registration state of the calibration information;

FIG. 32 is a diagram illustrating an example of a registration state of the calibration information and movable range information;

DESCRIPTION OF THE EMBODIMENTS

Figure 2:
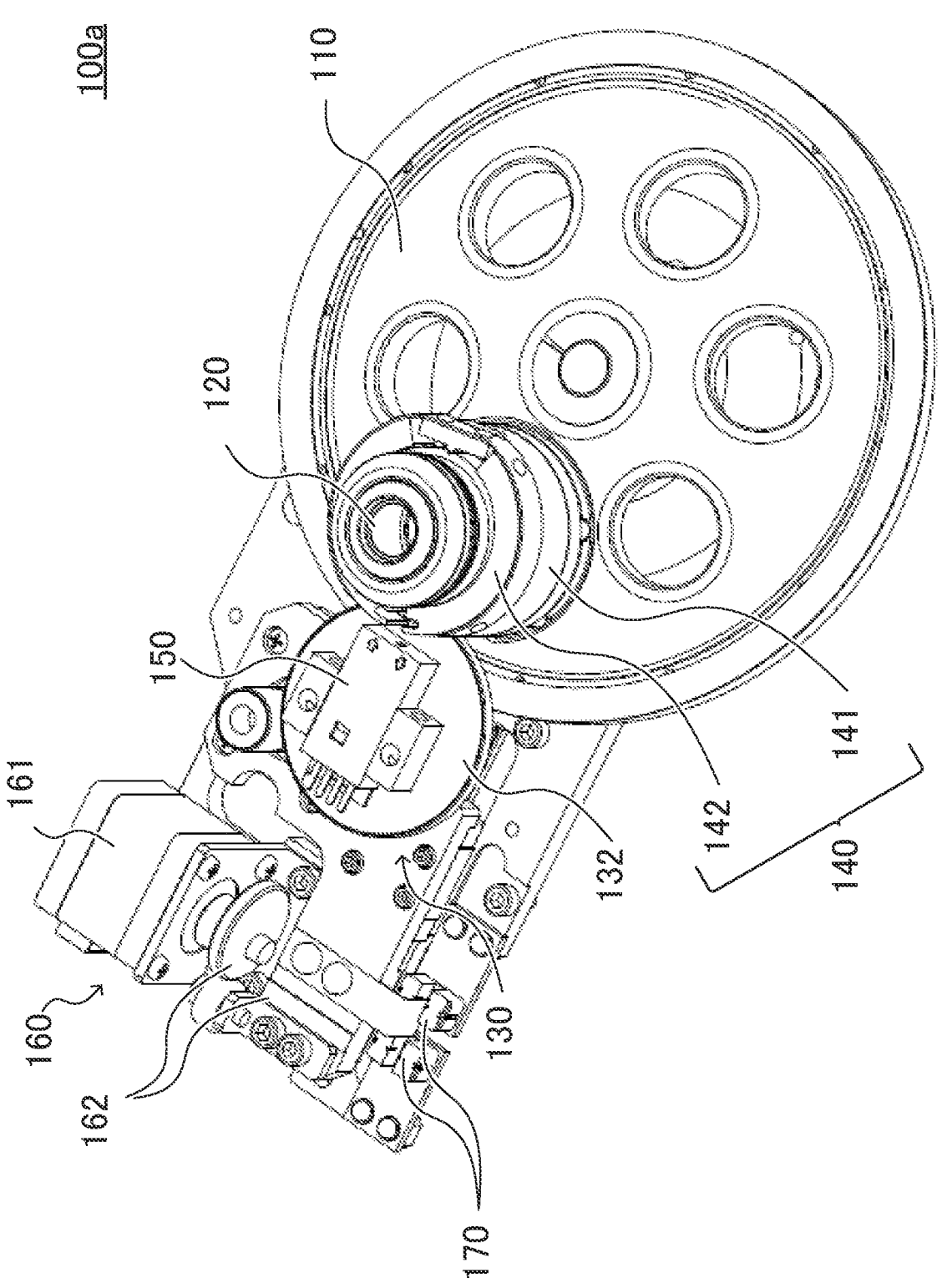
FIG. 2 is a perspective view of a motorized correction collar mechanism in a state in which an objective lens is mounted.

It is desirable that the mechanism for electrically adjusting a correction collar can be used with any objective lens including the correction collar. In reality, however, such a mechanism is provided integrally with a specifically designed objective lens having a particular correction collar.

Hereinafter, embodiments of the present invention will be described.

First Embodiment

Figure 1:
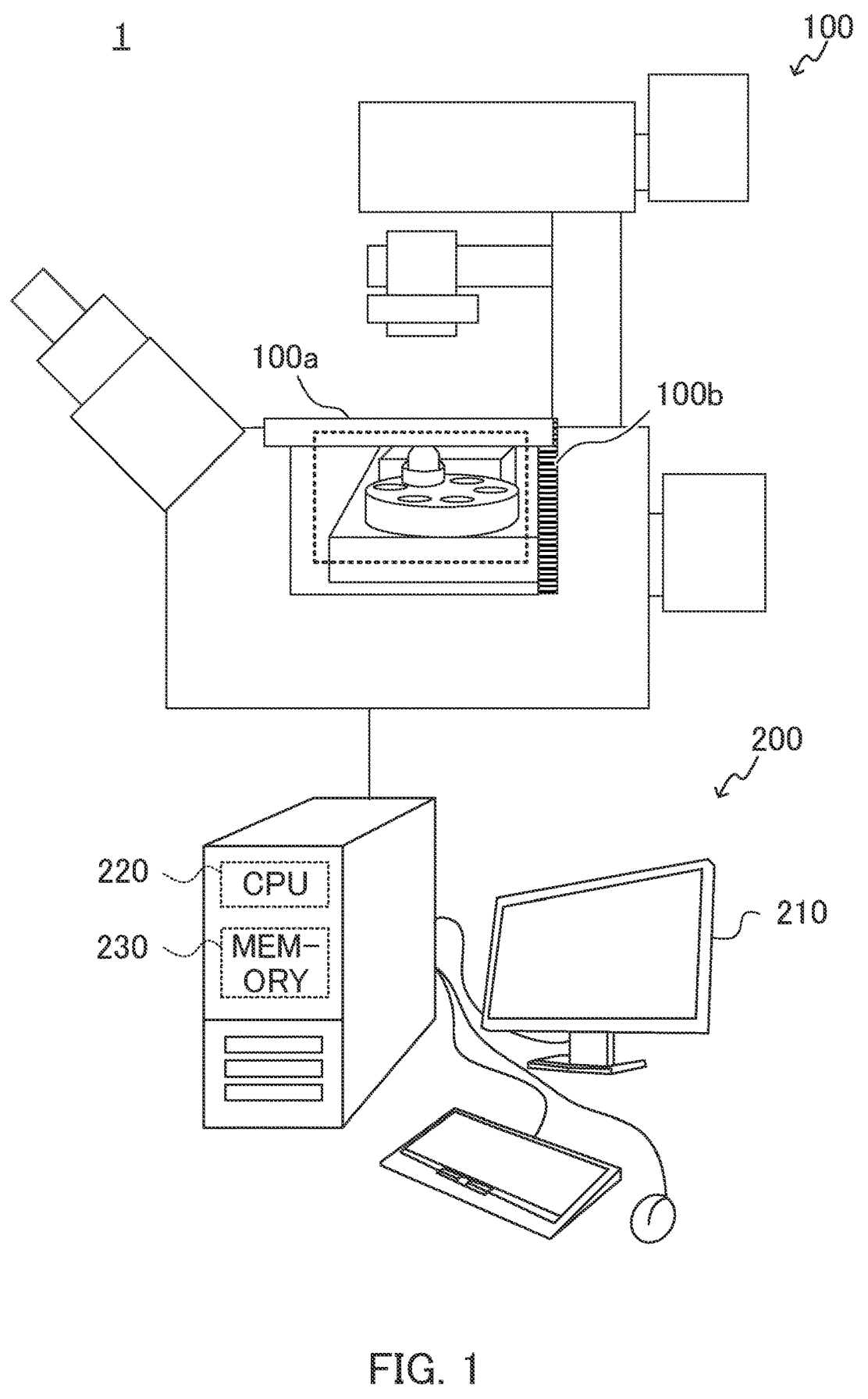

FIG. 1 is a diagram illustrating a configuration of a motorized correction collar system. The motorized correction collar system 1 illustrated in FIG. 1 is a microscope system including a microscope 100 having a motorized correction collar mechanism 100a that moves a correction collar, and a control device 200 that controls the motorized correction collar mechanism 100a. The microscope 100 includes a focusing mechanism 100b that changes a distance between a stage and a revolver.

The motorized correction collar system 1 can correctly move the correction collar to a correction collar position designated by a user using the motorized correction collar mechanism 100a regardless of an objective lens used. The motorized correction collar system 1 automatically performs calibration for realizing such appropriate movement of the correction collar (hereinafter referred to as correction collar calibration) using calibration information created in advance.

The microscope 100 is, for example, an inverted microscope as illustrated in FIG. 1, but may be an upright microscope. The control device 200 is, for example, a computer including a processor 220 such as a CPU and a memory 230. The processor 220 is an example of a control unit, and the memory 230 is an example of a storage unit and includes a volatile memory and a nonvolatile memory. The memory 230 stores the above-described calibration information for each individual objective lens with a correction collar or at least for each type of objective lens with a correction collar. The control device 200 may further include an input device such as a keyboard and a mouse, and an output device such as a display device 210.

Figure 3:
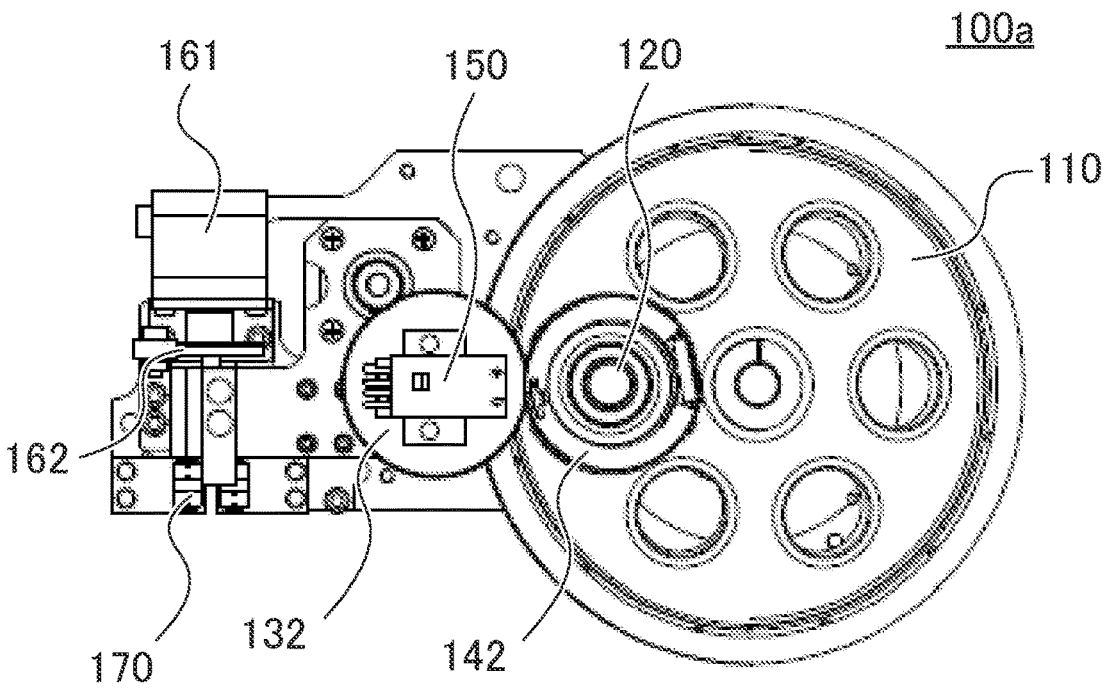
FIG. 3 is a top view of the motorized correction collar mechanism in a state in which the objective lens is mounted.
Figure 4:
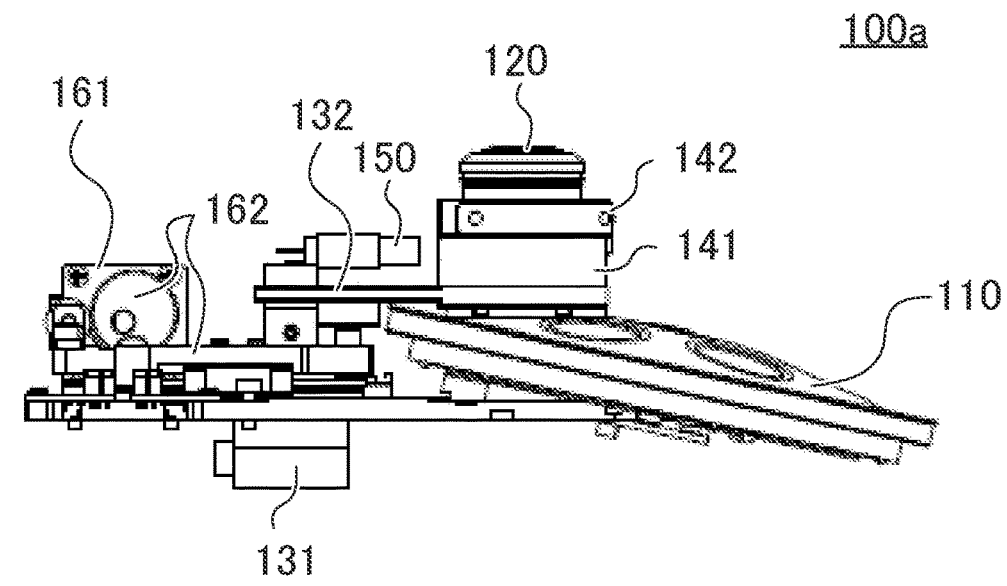
FIG. 4 is a side view of the motorized correction collar mechanism in a state in which the objective lens is mounted.
Figure 5:
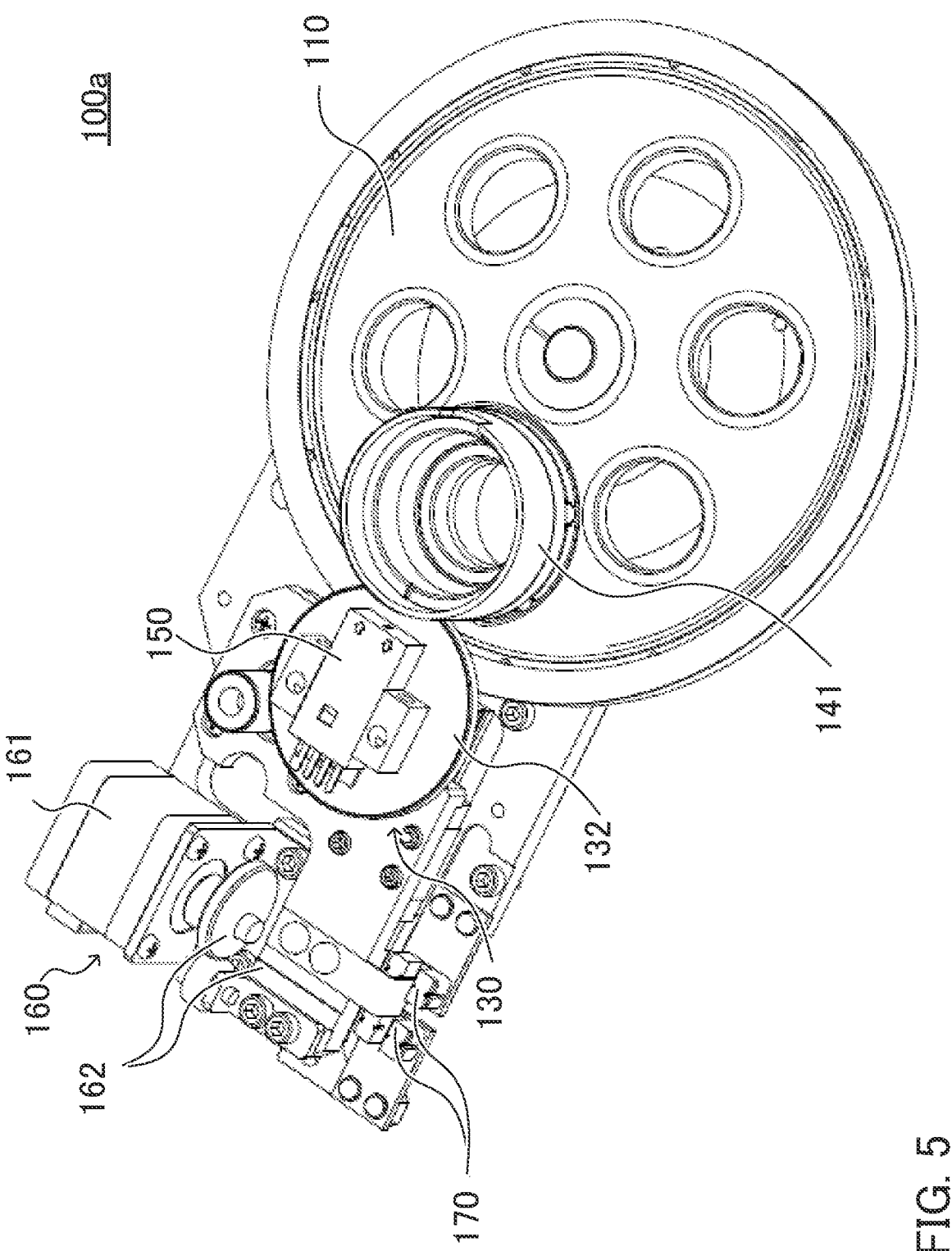
FIG. 5 is a perspective view of the motorized correction collar mechanism in a state in which the objective lens is removed.
Figure 8:
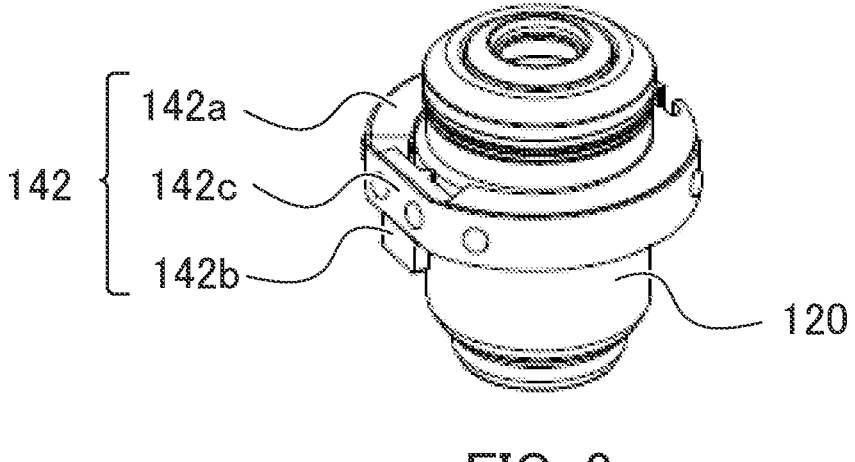
FIG. 8 is a perspective view of the objective lens to which an objective lens attachment is attached.
Figure 9:
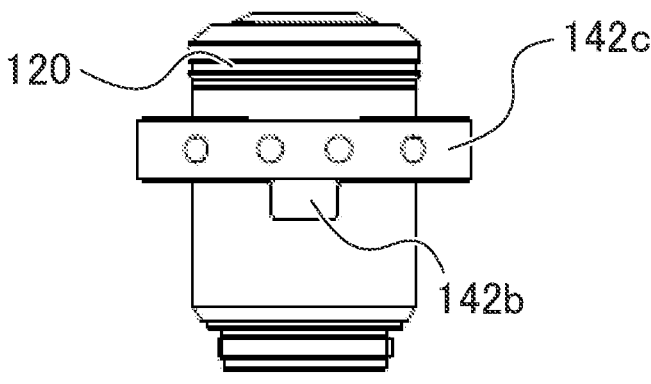
FIG. 9 is a side view of the objective lens to which the objective lens attachment is attached.
Figure 10:
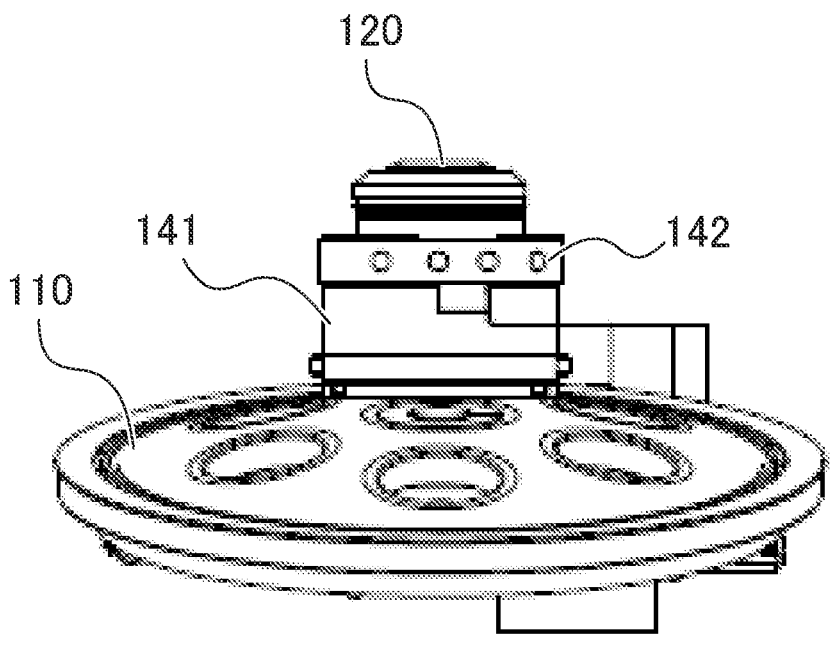
FIG. 10 is a side view of a vicinity of a revolver in a state in which the objective lens to which the objective lens attachment is attached is mounted.
Figure 11:
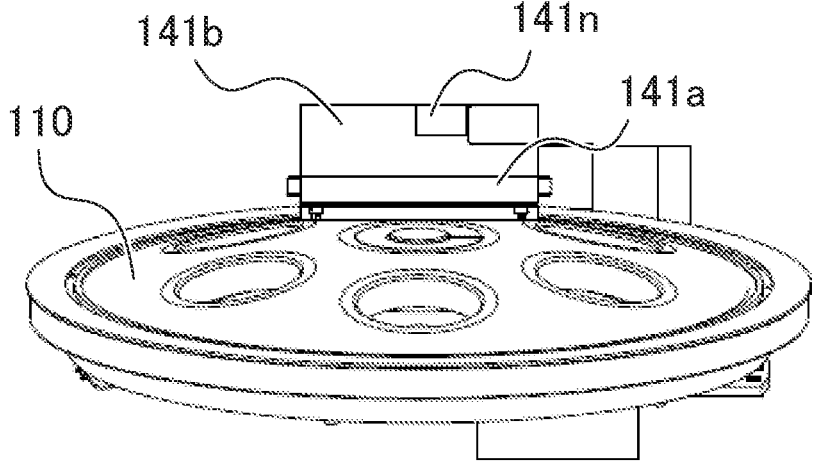
FIG. 11 is a side view of the vicinity of the revolver in a state in which the objective lens is removed.
Figure 12A:
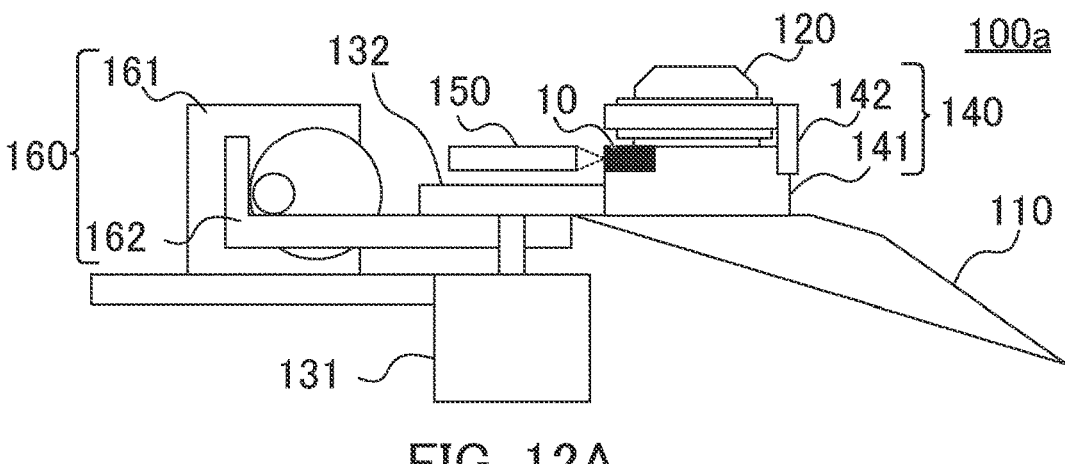
FIG. 12A is a diagram for describing a retraction operation by a retraction mechanism.
Figure 12B:
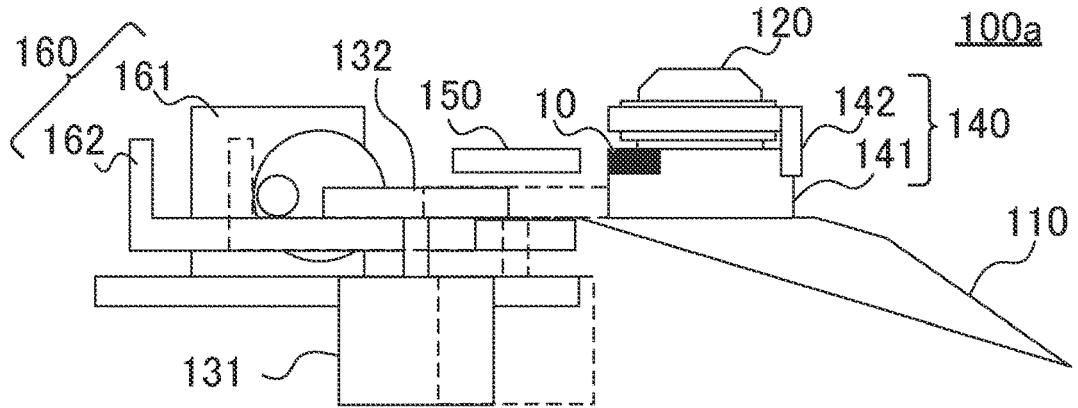
FIG. 12B is a diagram for describing a retraction operation by a retraction mechanism.
Figure 13:
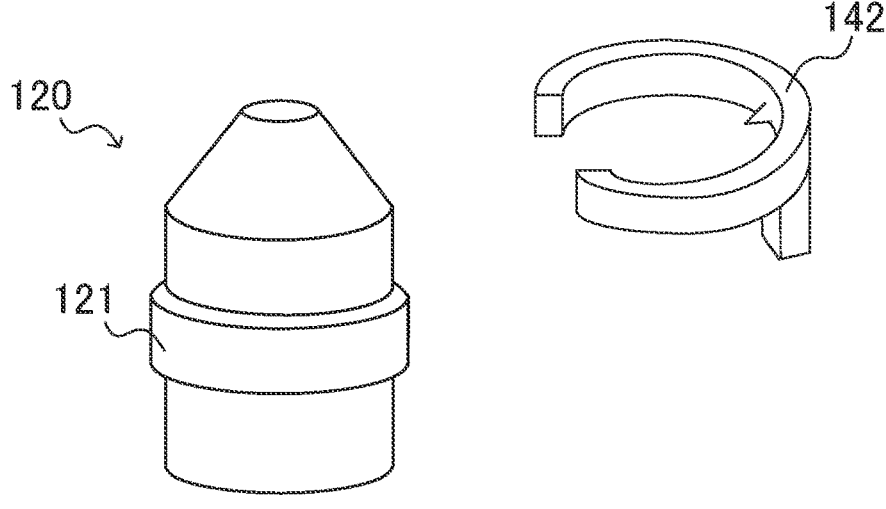
FIG. 13 is a diagram for describing an attachment position of the objective lens attachment to the objective lens.

FIG. 2 is a perspective view of a motorized correction collar mechanism in a state in which an objective lens is mounted. FIG. 3 is a top view of the motorized correction collar mechanism in a state in which the objective lens is mounted. FIG. 4 is a side view of the motorized correction collar mechanism in a state in which the objective lens is mounted. FIG. 5 is a perspective view of the motorized correction collar mechanism in a state in which the objective lens is removed. FIG. 6 is a top view of the motorized correction collar mechanism in a state in which the objective lens is removed. FIG. 7 is a side view of the motorized correction collar mechanism in a state in which the objective lens is removed. FIG. 8 is a perspective view of the objective lens to which an objective lens attachment is attached. FIG. 9 is a side view of the objective lens to which the objective lens attachment is attached. FIG. 10 is a side view of a vicinity of a revolver in a state in which the objective lens to which the objective lens attachment is attached is mounted. FIG. 11 is a side view of the vicinity of the revolver in a state in which the objective lens is removed. FIG. 12 is a diagram for describing a retraction operation by a retraction mechanism. FIG. 13 is a diagram for describing an attachment position of the objective lens attachment to the objective lens. Hereinafter, with reference to FIGS. 2 to 13, a configuration of the motorized correction collar mechanism 100a will be described in detail.

The motorized correction collar mechanism 100a moves the correction collar of an objective lens 120 with the correction collar attached to a revolver 110. As illustrated in FIG. 2, the motorized correction collar mechanism 100a includes the revolver 110, a drive mechanism 130, a transmission mechanism 140, a sensor 150, a retraction mechanism 160, and a sensor 170.

The revolver 110 is an example of an attachment portion to which the objective lens is attached. The revolver 110 is, for example, an electric revolver, and can switch an objective lens arranged on an observation optical axis according to an instruction from the control device 200. Although FIGS. 2 to 4 illustrate an example in which only the objective lens 120 is mounted to the revolver 110, six attachment holes are provided in the revolver 110, so that a maximum of six objective lenses can be mounted to the revolver 110.

The objective lens 120 is an objective lens with a correction collar. The correction collar refers to a mechanism that moves a part of the plurality of lenses constituting the objective lens in the optical axis direction, and the objective lens with the correction collar refers to an objective lens provided with the correction collar.

The objective lens 120 is provided with a correction collar ring 121, for example, as illustrated in FIG. 13. The correction collar ring 121 is an interface for operating the correction collar from the outside of the objective lens 120, and is a ring-shaped member surrounding a body of the objective lens 120. The correction collar is a mechanism that moves the lens inside the objective lens 120 in the optical axis direction as the correction collar ring 121 rotates.

As illustrated in FIGS. 4, 7, and 12, the drive mechanism 130 includes a motor 131 and a gear 132. The transmission mechanism 140 is a mechanism that transmits force from the drive mechanism 130 to the correction collar ring 121, and includes a rotation base 141 and an objective lens attachment 142 that holds the correction collar ring 121 as illustrated in FIGS. 2, 4, 10, and 12.

The motor 131 is a force source that generates force for rotating the correction collar ring 121, that is, force to be transmitted to the objective lens attachment 142. The motor 131 may be, for example, a stepping motor. The rotation of the motor 131 is controlled by the control device 200.

The gear 132 is a gear that transmits the force generated by the motor 131 to the transmission mechanism 140 from the motor 131. As illustrated in FIG. 12, the motor 131 and the gear 132 are fixed to a retraction mechanism 160 to be described later and are not fixed to the revolver 110.

The rotation base 141 is an example of a driven portion that transmits the force generated by the motor 131 from the drive mechanism 130 to the objective lens attachment 142. As illustrated in FIGS. 5 to 7, the rotation base 141 is a hollow cylindrical member fixed to the revolver 110 so as to surround the attachment hole of the revolver 110, and is configured to be rotatable around the attachment hole. As illustrated in FIG. 11, the rotation base 141 includes a gear portion 141a on which a gear is formed and a hollow cylindrical portion 141b on which no gear is formed, and these portions rotate integrally around the attachment hole.

As illustrated in FIG. 7, the gear portion 141a engages, specifically, meshes with the gear 132, so that the force generated by the motor 131 is transmitted to the rotation base 141 via the gear 132. That is, when the gear portion 141a engages with the gear 132, the rotation base 141 rotates around the attachment hole.

As illustrated in FIG. 11, the hollow cylindrical portion 141b is provided with a notch 141n. A member 142b of the objective lens attachment 142 illustrated in FIG. 9 engages, specifically meshes with the notch 141n, so that the objective lens attachment 142 rotates together with the rotation base 141. That is, the notch 141n plays a role of connecting and interlocking a configuration fixed to the microscope 100 side of the motorized correction collar mechanism 100a (the rotation base 141 of the transmission mechanism 140) and a configuration detachable from the microscope 100 (the objective lens attachment 142 of the transmission mechanism 140).

Further, the notch 141n positions the member 142b of the objective lens attachment 142 that is a detachable configuration from the rotation base 141 fixed to the microscope 100. That is, the notch 141n also serves to direct the objective lens attachment 142 in a certain direction with respect to the rotation base 141.

With this configuration, the position (orientation) of the objective lens attachment 142 is always maintained in a constant relationship with the position (orientation) of the rotation base 141 rotated by the force from the drive mechanism 130. Therefore, controlling the rotation of the motor 131 based on the position (orientation) of the rotation base 141 allows the position (orientation) of the objective lens attachment 142 to be controlled with high accuracy.

As illustrated in FIG. 12, an index 10 detected by the sensor 150 to be described later is affixed to the hollow cylindrical portion 141b. The index 10 is a belt-shaped index extending in the circumferential direction of the hollow cylindrical portion 141b, but is not limited to one such that the light intensity detected by the sensor 150 is different between a portion where the index 10 is present and a portion where the index 10 is not present, as illustrated in this example. Any index can be adopted as long as the position (orientation) serving as the reference of the rotation base 141 can be identified. For this reason, for example, when the sensor 150 is not a photosensor but a magnetic sensor, the index 10 may be a magnet attached to the hollow cylindrical portion 141b. The sensor 150 may be an image sensor. When the sensor 150 is the image sensor, for example, the control device 200 may compare an image corresponding to the position serving as the reference stored in advance with an image of the index 10 acquired by the image sensor to detect the position serving as the reference of the rotation base, and the control device 200 may perform image processing on the acquired image of the index 10 to recognize the movement amount or any position of the index 10.

The objective lens attachment 142 is an example of a grip portion that grips the correction collar ring 121 of the objective lens 120, and is detachable from the objective lens 120. In addition, as illustrated in FIG. 10, the objective lens attachment 142 is used in a state of being fitted to the rotation base 141, but is merely placed on the rotation base 141 and is not fixed, and can be easily removed from the rotation base 141. As illustrated in FIG. 8, the objective lens attachment 142 may include, for example, a member 142a, the member 142b, and a member 142c.

The member 142a grips the correction collar ring 121 from the left and right. The member 142a has a curved surface fitting the shape of the correction collar ring 121 of the objective lens 120, and this curved surface comes into contact with the correction collar ring 121. A knurled portion may be formed on the curved surface serving as the contact surface to prevent slippage.

The member 142b is a member located between the left and right members 142a. As illustrated in FIG. 9, a part of the member 142b protrudes from the member 142a toward the body surface side of the objective lens 120, that is, toward the rotation base 141. This protrusion (first protrusion) of the member 142b fits into the notch 141n.

As illustrated in FIGS. 8 and 13, a projection (second projection) that meshes with a screw thread of the correction collar ring 121 is formed on the surface of the member 142b facing the objective lens 120. When this protrusion meshes with the screw thread of the correction collar ring 121, the objective lens attachment 142 rotates with respect to the correction ring 121 without slippage, and as a result, the correction collar ring 121 rotates by the same amount as the rotation amount of the objective lens attachment 142.

The member 142c is an elastic member that fixes the member 142a and the member 142b. When the elastic force of the member 142c acts such that the member 142a fixed to the member 142c tightens the correction collar ring 121, the objective lens attachment 142 grips the correction collar ring 121.

The sensor 150 is an example of a sensor that detects a reference position of the transmission mechanism 140. The sensor 150 is, for example, a reflective photosensor that detects a color change using infrared rays, and detects the reference position of the transmission mechanism 140 based on the index 10 provided on the rotation base 141. More specifically, the sensor 150 detects the reference position by detecting the end of the index 10 based on the difference between the color of the index 10 and the color of the rotation base 141.

The reference position of the transmission mechanism 140 may be any position as long as it indicates a specific state of the transmission mechanism 140. What the specific state is is not described, but the state has a one-to-one relationship with the correction collar position for each objective lens. Therefore, at the reference position, that is, in the specific state, the same correction collar position is always reproduced for each objective lens.

The retraction mechanism 160 is a mechanism that retracts the drive mechanism 130 from a position where the drive mechanism 130 engages with the rotation base 141. As illustrated in FIG. 2, the retraction mechanism 160 includes a motor 161 and a cam mechanism 162.

The motor 161 is a force source that drives the cam mechanism 162. The motor 161 is, for example, a stepping motor. The rotation of the motor 161 is controlled by the control device 200.

The cam mechanism 162 converts the rotational motion of the motor 161 into a linear reciprocating motion. The drive mechanism 130 is fixed to the cam mechanism 162. With this configuration, the drive mechanism 130 moves between the position where the drive mechanism 130 engages with the transmission mechanism 140 (rotation base 141) as illustrated in FIG. 12A, and a position where the drive mechanism 130 does not engage with the transmission mechanism 140 (rotation base 141) as illustrated in FIG. 12B.

The retraction mechanism 160 may retract the drive mechanism 130 from the position where the drive mechanism 130 engages with the rotation base 141 in conjunction with the rotation of the revolver 110 according to an instruction from the control device 200. With this configuration, the drive mechanism 130 automatically moves to a position where the drive mechanism 130 is not in contact with the transmission mechanism 140 when the revolver 110 rotates, thereby making it possible to avoid the application of a large force between the drive mechanism 130 and the transmission mechanism 140.

The sensor 170 is a sensor that detects the position of the cam mechanism 162 that moves with linear motion. As illustrated in FIG. 2, the sensor 170 may be, for example, a photointerrupter, and may detect that the cam mechanism 162 is at a predetermined position.

When the retraction mechanism 160 returns the drive mechanism 130 to the position where the drive mechanism 130 engages with the transmission mechanism 140, the tooth tips of the gear 132 and the rotation base 141 (gear portion 141a) collide and do not mesh with each other, and as a result, the drive mechanism 130 may fail to move to the engagement position. Basically, the configuration is such that an elastic force (spring force) is applied to the drive mechanism 130 in a direction where the drive mechanism 130 engages with the transmission mechanism 140, and the tooth tips of the drive mechanism 130 and the transmission mechanism 140 slide and slightly move to mesh with each other; however, using the sensor 170 makes it possible to detect whether or not the retraction mechanism 160 has moved to the predetermined position. Therefore, if by any chance the drive mechanism 130 fixed to the retraction mechanism 160 fails to mesh with the transmission mechanism 140 and an engagement failure occurs, the failure can be detected. When the engagement failure is detected by the sensor 170, the control device 200 may cause the retraction mechanism 160 to perform a retraction operation again, and then perform a return operation again to ensure the engagement between the drive mechanism 130 and the transmission mechanism 140.

In the motorized correction collar system 1 configured as described above, as illustrated in FIG. 2, the drive mechanism 130 and the transmission mechanism 140 engage with each other in a state in which the objective lens attachment 142 is attached to the objective lens 120 mounted to the revolver 110, so that the force of the motor 131 can be transmitted to the objective lens attachment 142. Therefore, with the motorized correction collar system 1, the control device 200 controls the rotation of the motor 131, thereby controlling the transmission of the force to the objective lens attachment 142, so that the correction collar ring 121 can be rotated by a desired amount.

The control device 200 controls the operation of the motorized correction collar mechanism 100a. Specifically, for example, the following processing is executed. The control device 200 controls the transmission of force for rotating the correction collar ring 121 to the objective lens attachment 142 by controlling the rotation of the motor 131. In addition, the control device 200 controls the position of the drive mechanism 130 using the retraction mechanism 160 by controlling the rotation of the motor 161. Furthermore, the control device 200 recognizes that the transmission mechanism 140 is at the reference position based on a detection result by the sensor 150. The control device 200 also recognizes the engagement failure between the drive mechanism 130 and the transmission mechanism 140 based on a detection result by the sensor 170.

Next, it will be described that the motorized correction collar system 1 can accurately move the correction collar ring 121 to the correction collar position designated by the user. The motorized correction collar system 1 can accurately move the correction collar ring 121 to the position designated by the user by performing the calibration for each objective lens with the correction collar.

Figure 14:
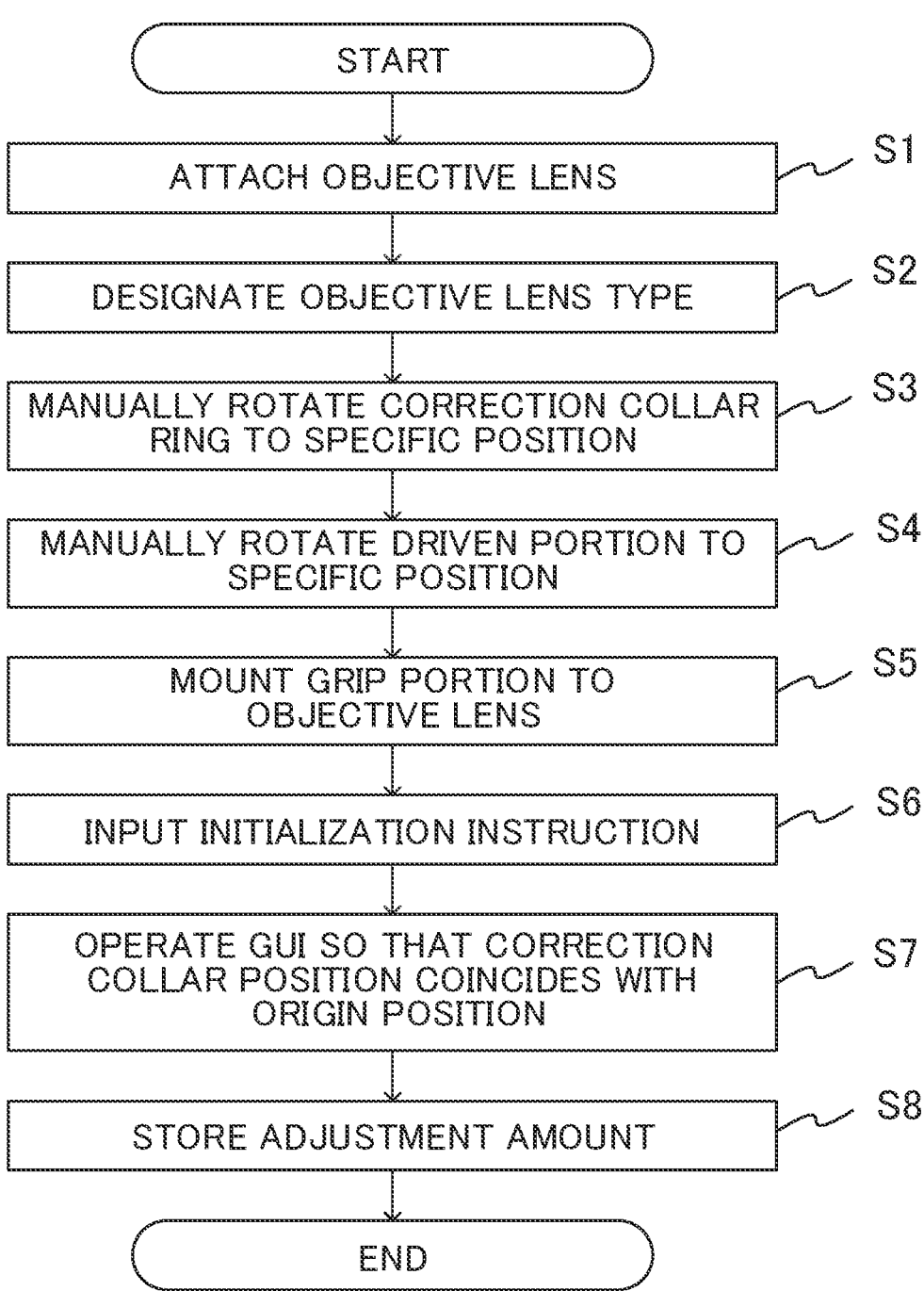
FIG. 14 is a flowchart illustrating a procedure for creating calibration information used for calibration.
Figure 15:
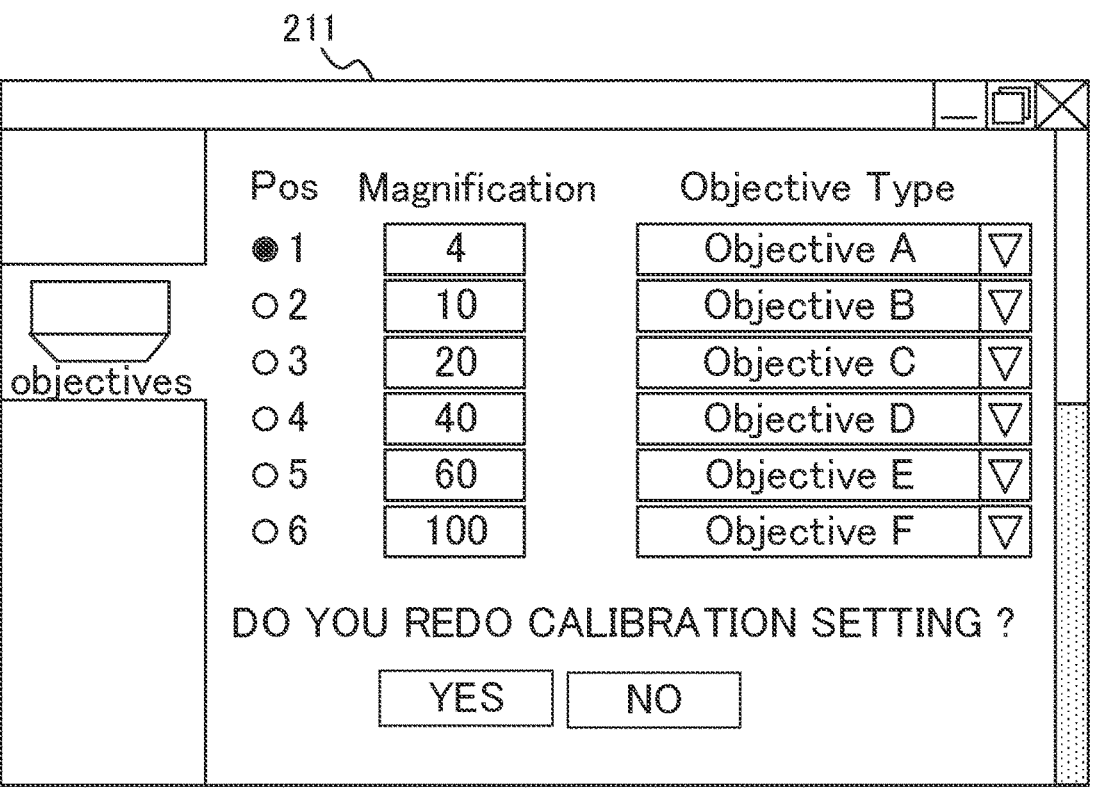
FIG. 15 is an example of a screen for registering the objective lens mounted to the revolver.
Figure 16:
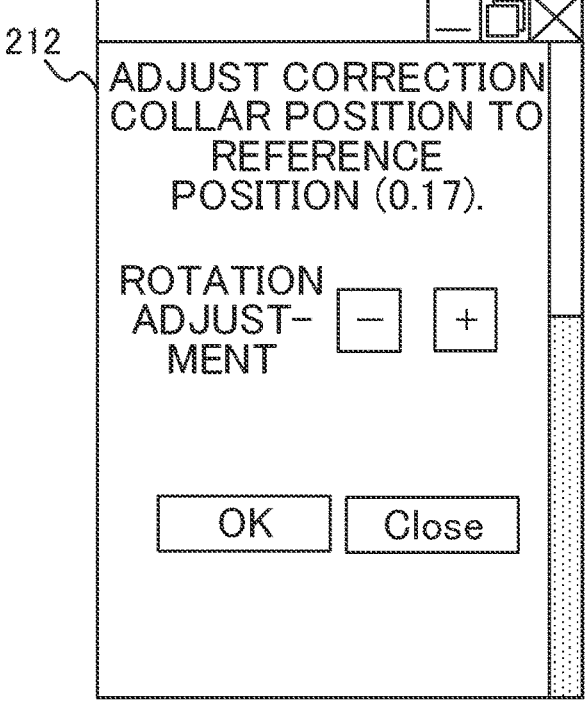
FIG. 16 is an example of a screen used for manual calibration.
Figure 17:
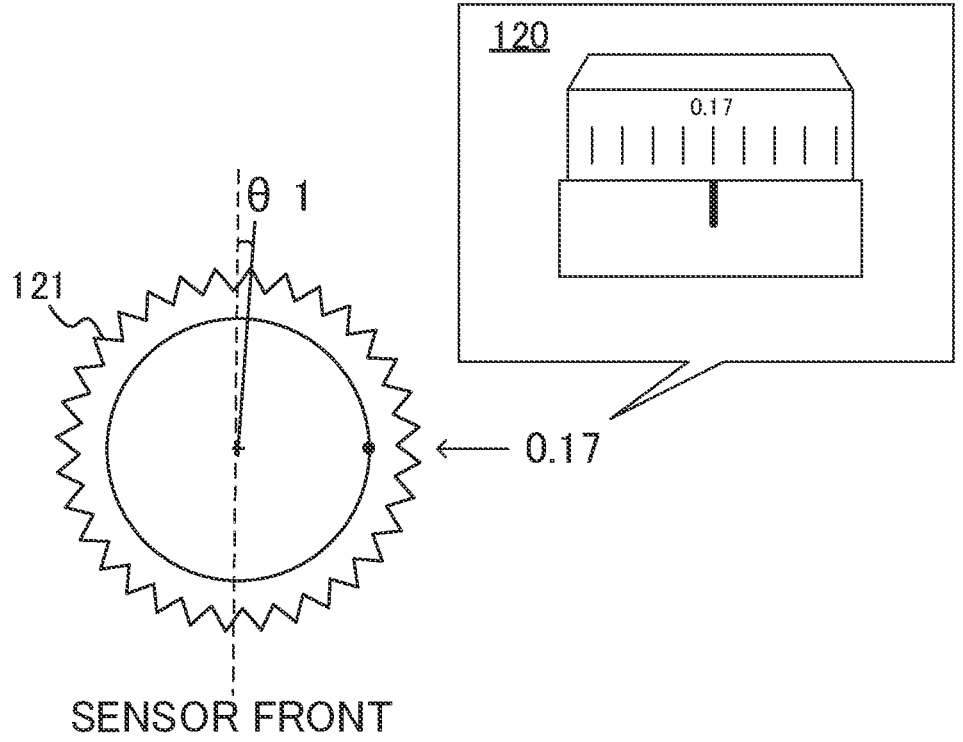
FIG. 17 is a diagram illustrating a state of the objective lens immediately after mounted to the revolver.
Figure 18:
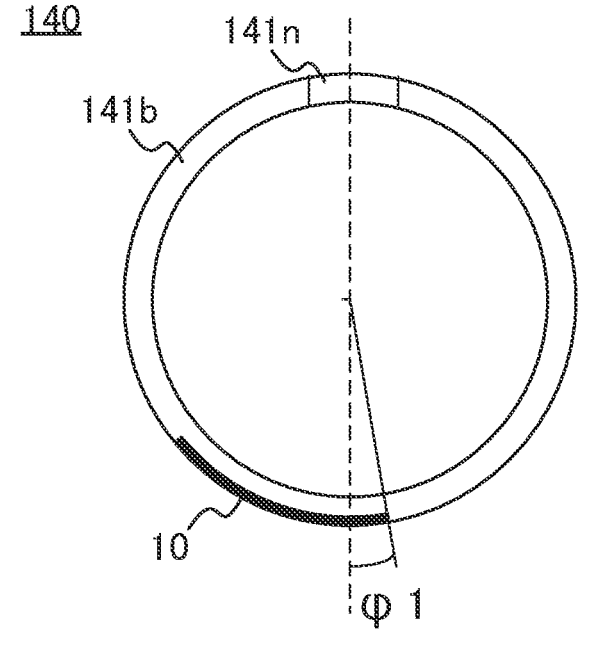
FIG. 18 is a diagram illustrating a state of a rotation base immediately before the objective lens attachment is attached to the objective lens.
Figures 19, 20:
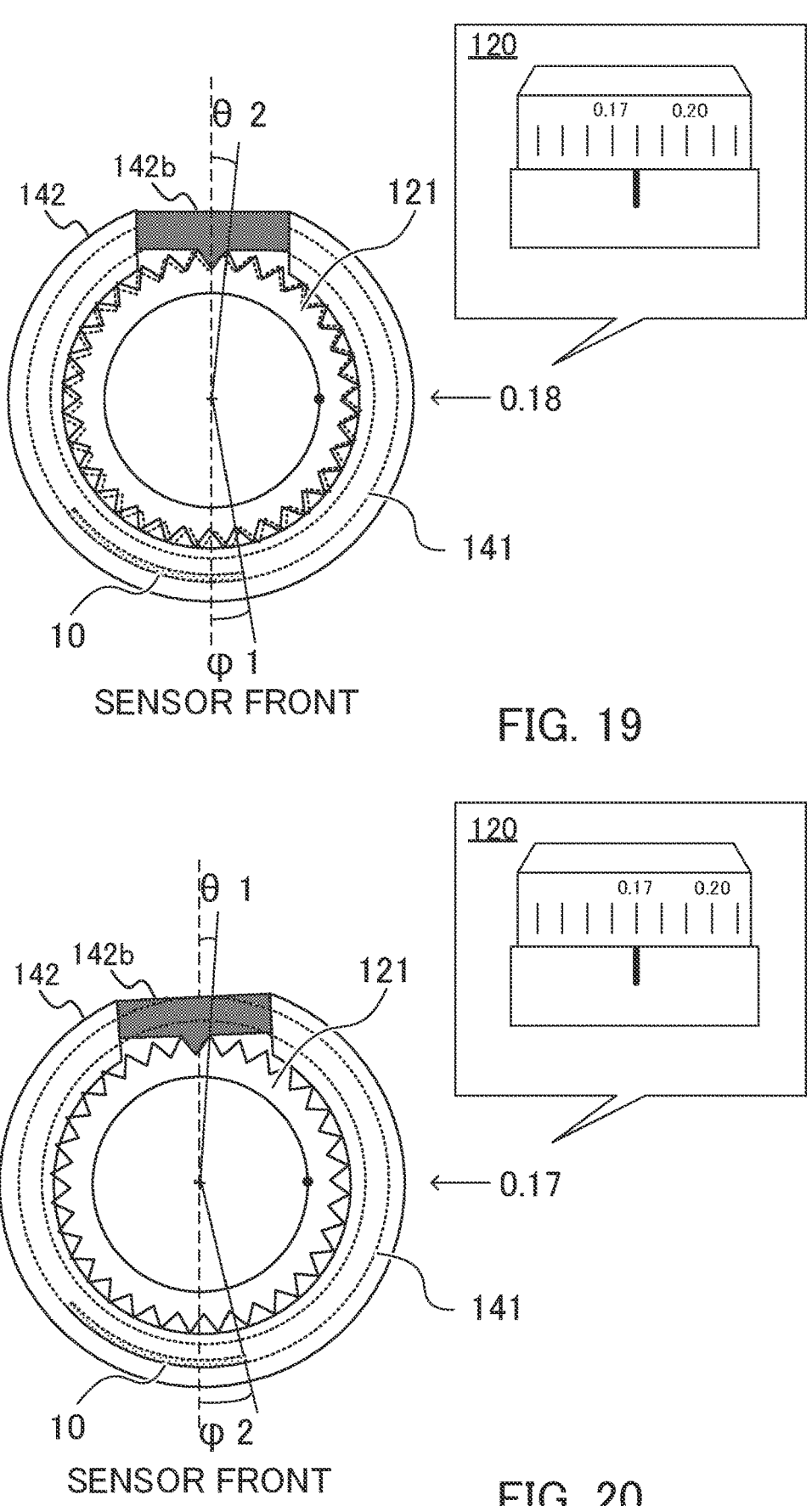
FIG. 19 is a diagram illustrating an example of a state immediately after the objective lens attachment is attached to the objective lens.
FIG. 20 is a diagram illustrating another example of the state immediately after the objective lens attachment is attached to the objective lens.
Figures 21, 22:
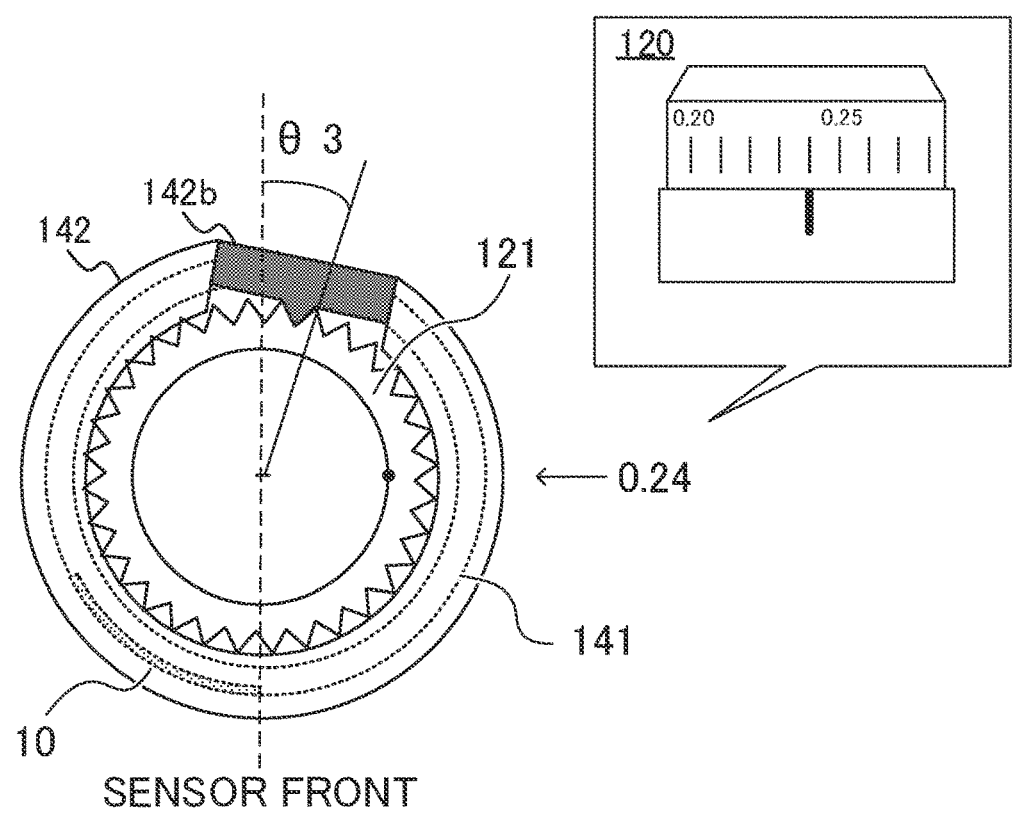
FIG. 21 is a diagram illustrating a state in which a correction collar position is moved until a reference position is detected after the objective lens attachment is attached.
FIG. 22 is a diagram illustrating an example of a registration state of the calibration information.

FIG. 14 is a flowchart illustrating a procedure for creating the calibration information used for the calibration. FIG. 15 is an example of a screen for registering the objective lens mounted to the revolver. FIG. 16 is an example of a screen used for manual calibration. FIG. 17 is a diagram illustrating a state of the objective lens immediately after mounted to the revolver. FIG. 18 is a diagram illustrating a state of the rotation base immediately before the objective lens attachment is attached to the objective lens. FIG. 19 is a diagram illustrating an example of a state immediately after the objective lens attachment is attached to the objective lens. FIG. 20 is a diagram illustrating another example of the state immediately after the objective lens attachment is attached to the objective lens. FIG. 21 is a diagram illustrating a state in which the correction collar position is moved until the reference position is detected after the objective lens attachment is attached. FIG. 22 is a diagram illustrating an example of a registration state of the calibration information. First, a method for creating the calibration information used in the calibration will be described with reference to FIGS. 14 to 22.

The calibration information is created through manual work performed by a human while visually checking the correction collar position, but this manual work may be performed, for example, at a factory or the like before the motorized correction collar system 1 is shipped. That is, an operator who creates the calibration information may be different from the user of the motorized correction collar system 1.

As will be described later, the calibration information is information regarding a misalignment between the correction collar position of the objective lens corresponding to the reference position of the transmission mechanism 140 and the origin position of the correction collar of the objective lens, and is desirably created for each objective lens with the correction collar. However, it is rare to use different individual objective lenses of the same type in the same motorized correction collar system. Therefore, in many cases, it is sufficient to create the calibration information for each type of objective lens with the correction collar. Hereinafter, a case where calibration information for the objective lens 120 is created will be described as an example.

When the creation processing of the calibration information illustrated in FIG. 14 is started, the operator first activates the motorized correction collar system 1, and then attaches the objective lens 120 whose calibration information is to be created to the revolver 110 (step S1). At this time, the objective lens 120 is attached to an attachment hole having the rotation base 141.

Next, the operator designates the type of the attached objective lens 120 to the motorized correction collar system 1 (step S2). This is done to have the motorized correction collar system 1 recognize the type of the attached objective lens 120. Specifically, for example, the type of the objective lens 120 may be designated by selecting the type of the objective lens 120 for the attachment hole (Pos) to which the objective lens 120 has been attached from the items of a drop-down list on a window 211 of the application of the motorized correction collar system 1, as illustrated in FIG. 15. The type of the objective lens 120 may be selected not only from existing items but also by a method in which the user manually inputs a model number or a type name or a method in which a barcode or an RFID provided in the objective lens 120 in advance is read to recognize a recorded type.

Then, the operator orients each of the correction collar ring 121 of the objective lens 120 and the rotation base 141 in a certain direction with respect to the revolver 110. Specifically, the operator first manually turns the correction collar ring 121 of the objective lens 120 attached to the revolver 110 to a specific position (scale) (step S3). The specific position is not particularly limited, but is desirably a position frequently used as a correction collar position, such as 0.17 mm, because the specific position functions as the origin position of the correction collar after the calibration. In the following description, as illustrated in FIG. 17, a case where the specific position is a 0.17 mm position and the operator adjusts the correction collar ring 121 to the 0.17 mm position in step S3 will be described as an example.

Since threading of the objective lens varies depending on each objective lens, the orientation of the objective lens (with respect to the revolver 110) when attached to the revolver 110 varies depending on the objective lens. However, the same individual objective lens (in particular, when attached with equivalent strength) reproduces the same orientation no matter how many times the objective lens is reattached to the revolver 110. Further, aligning the correction collar ring of the objective lens to the specific position causes the same orientation of the correction collar ring to be reproduced no matter how many times the objective lens is reattached. Therefore, for example, as illustrated in FIG. 17, the angle between a specific direction and the screw thread of the correction collar ring 121 closest to the specific direction is also constant (in this example, an angle $\theta 1$).

Further, the operator manually rotates the rotation base 141 that is the driven portion to a specific position (step S4). The specific position is not particularly limited as long as it is a predetermined position. However, it is desirable here to rotate the rotation base 141 so that the end of the index 10 comes close to the sensor 150 in order that the sensor 150 can detect the end of the index 10 (reference position) in the rotation range of the correction collar ring determined for each objective lens. For example, the rotation base 141 may be set at the specific position by orienting the notch 141n of the rotation base 141 toward a mark affixed to the revolver 110.

Adjusting the orientation of the rotation base 141 in such a procedure causes the rotation base 141 to be always oriented in a certain direction even when adjustment is performed using another objective lens to be calibrated. Therefore, for example, as illustrated in FIG. 18, the angle between a specific direction and the end of the index 10 affixed to the rotation base 141 (hollow cylindrical portion 141b) is constant (in this example, an angle $\varphi 1$).

After the correction collar ring 121 and the rotation base 141 are oriented in the certain direction with respect to the revolver 110, the user then attaches the objective lens attachment 142 that is the grip portion to the objective lens (step S5). At this time, the objective lens attachment 142 grips the correction collar ring 121 while engaging with the rotation base 141.

When the member 142b of the objective lens attachment 142 is fitted into the notch 141n of the rotation base 141, the correction collar ring 121 or the rotation base 141, or both may rotate slightly. This is because the correction collar ring 121 and the rotation base 141 need to move in a relative manner to each other so that the protrusion of the member 142b extending toward the correction collar ring 121 and the screw thread of the correction collar ring 121 mesh with each other, depending on the positional relationship between the protrusion and the screw thread.

As a result, after the objective lens attachment 142 is mounted, the angle between the specific direction and the screw thread of the correction collar ring 121 closest to the specific direction changes from before the objective lens attachment 142 is mounted when the correction collar ring 121 rotates, as illustrated in FIG. 19. In this example, the angle $\theta 1$ changes to an angle $\theta 2$. When the rotation base 141 rotates, the angle between the specific direction and the end of the index 10 affixed to the rotation base 141 changes from before the objective lens attachment 142 is attached, as illustrated in FIG. 20. In this example, the angle $\varphi 1$ changes to an angle $\varphi 2$.

The amount of such relative movement between the correction collar ring 121 and the rotation base 141 that occurs when the objective lens attachment 142 is attached varies depending on each objective lens. This is because $\varphi 1$ does not depend on the objective lens, but $\theta 1$ varies depending on each objective lens, and the interval, depth, and the like of the screw thread of the correction collar ring may also vary depending on each objective lens. This point, along with the point that the angle $\theta 1$ varies depending on each objective lens, is a main factor that sufficient calibration accuracy cannot be obtained even if calibration is uniformly performed regardless of the objective lens.

After the objective lens attachment 142 is attached, the user inputs an initialization instruction (step S6). For example, the user can input the initialization instruction by selecting to redo the calibration setting on the window 211.

When receiving the initialization instruction, the control device 200 controls the motor 131 until the sensor 150 detects the reference position of the transmission mechanism 140. Specifically, as illustrated in FIG. 21, the rotation base 141 is rotated until the end of the index 10 moves to the front of the sensor 150. The correction collar ring 121 also rotates when the rotation base 141 rotates, which causes the correction collar position to be a position different from the specific position manually set in step S3 (in this example, 0.17).

That is, in the motorized correction collar system 1, when the transmission mechanism 140 is aligned with the reference position and the state is determined as the origin position for correction collar control by the motorized correction collar system 1, the following inconvenience occurs. Since correction collar control using as the origin position the correction collar position different from the specific position set in step S3 assuming the origin position (for example, 0.17 mm) is performed, the motorized correction collar mechanism 100a cannot correctly move the correction collar to the correction collar position designated by the user.

Therefore, in steps S7 and S8, the information regarding the misalignment between the correction collar position of the objective lens corresponding to the reference position of the transmission mechanism 140 and the origin position of the correction collar of the objective lens is stored as the calibration information.

Specifically, the user first operates the GUI so that the correction collar position coincides with the origin position (step S7). The origin position of the correction collar is, for example, the specific position in step S3.

In step S7, for example, the user may adjust the correction collar position on the window 212 of the application as illustrated in FIG. 16. When the correction collar position has moved to 0.24 as a result of the initialization operation performed in step S6 as illustrated in FIG. 21, the user may press a minus button to turn the correction collar ring in the minus direction while visually checking the correction collar position until the correction collar position becomes 0.17.

When the adjustment is completed, the control device 200 stores the adjustment amount of the correction collar position in the adjustment performed in step S7 (step S8). Here, for example, the control device 200, when detecting that an OK button on the window 211 illustrated in FIG. 21 has been pressed, stores the adjustment amount of the correction collar position in the adjustment performed using the motorized correction collar mechanism 100a (in this example, an angle $\alpha 1$ corresponding to 0.24-0.17=0.07 mm) in the memory 230 as calibration information unique to the objective lens 120 as illustrated in FIG. 22. The type of the objective lens 120 is "Objective E".

Calibration information for each objective lens with the correction ring can be created by repeatedly performing the processing illustrated in FIG. 14 for each objective lens with the correction collar.

The motorized correction collar system 1 can accurately move the correction collar ring to the position designated by the user by performing calibration optimized for each objective lens with the correction collar using the calibration information created as described above.

Figure 23:
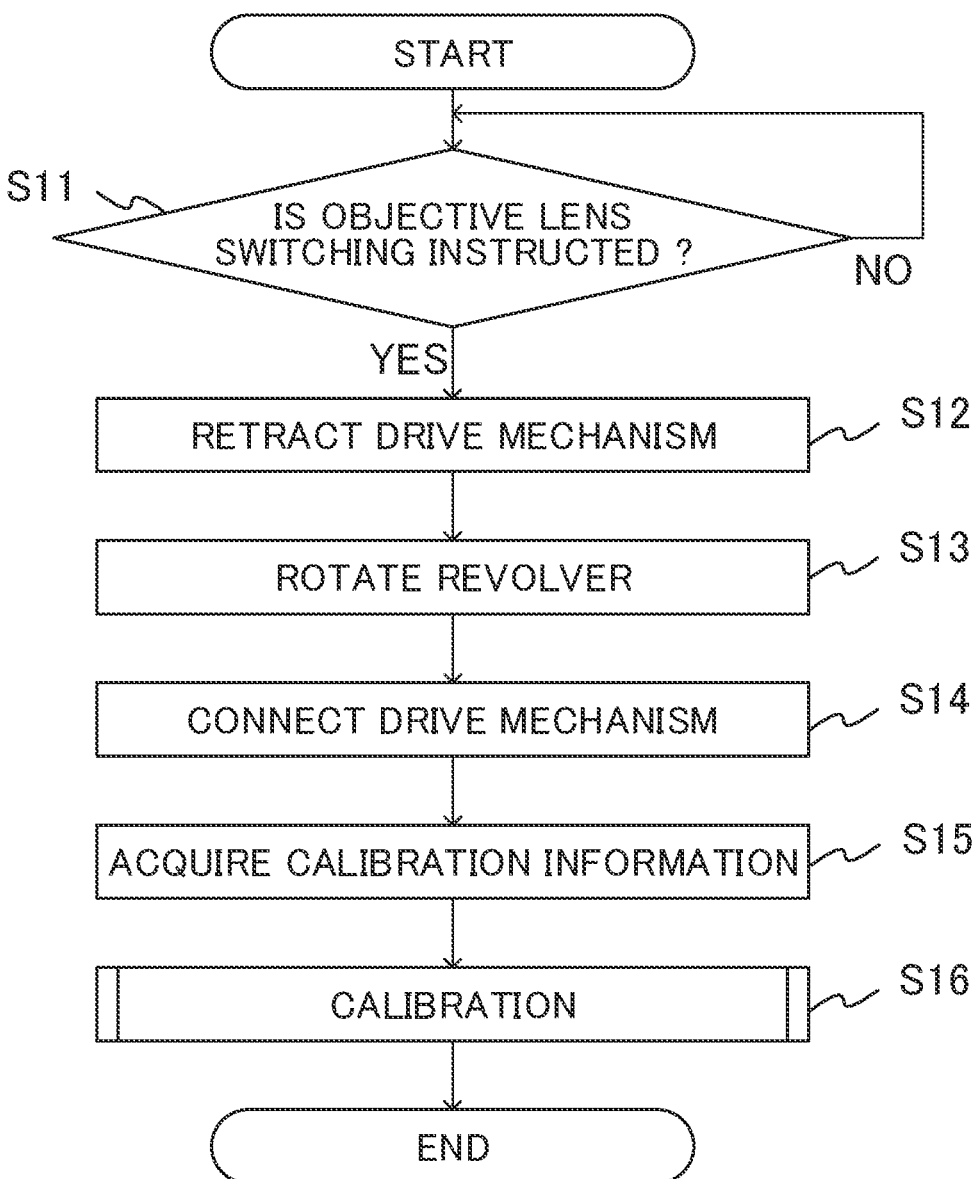
FIG. 23 is an example of a flowchart of objective lens switching processing.
Figure 24:
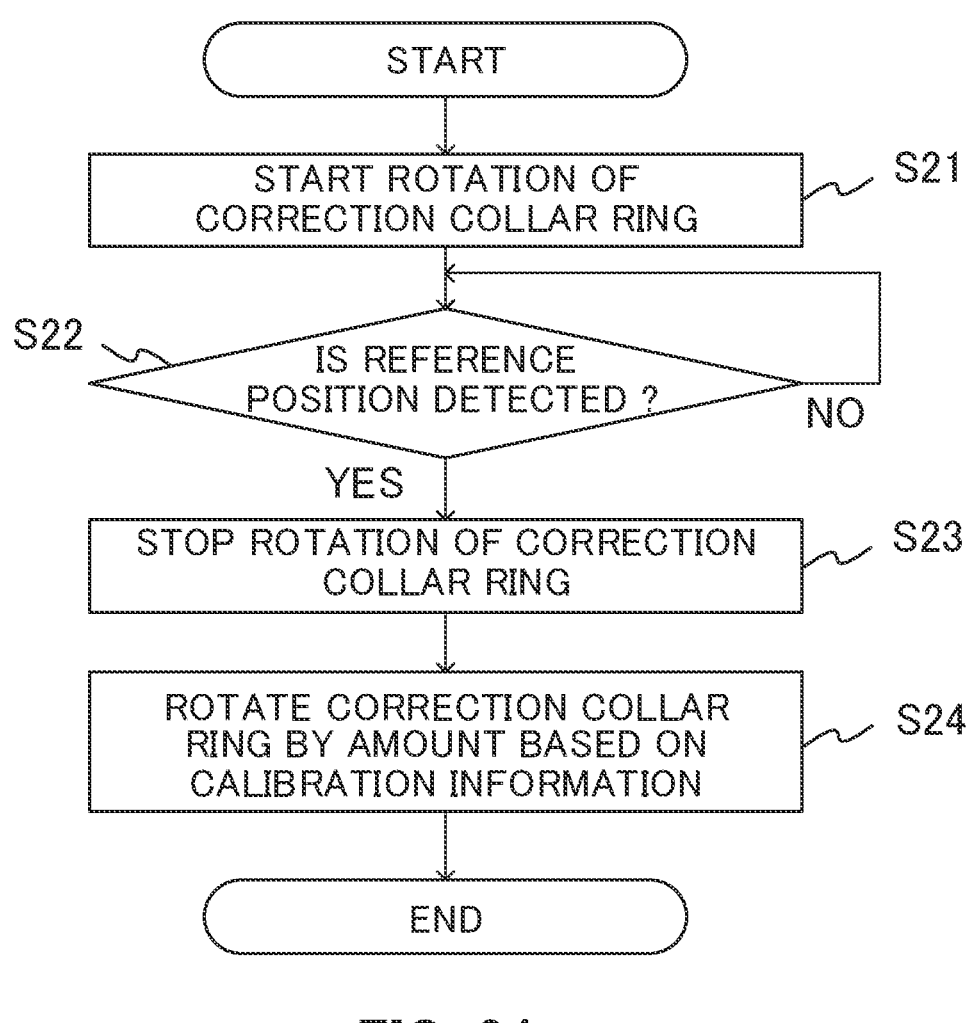
FIG. 24 is an example of a flowchart of calibration processing.
Figure 25:
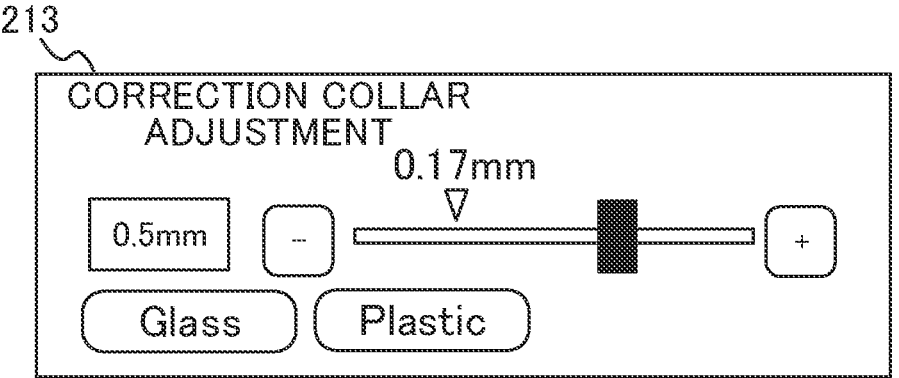
FIG. 25 is a diagram illustrating an example of a correction collar adjustment screen.

FIG. 23 is an example of a flowchart of objective lens switching processing. FIG. 24 is an example of a flowchart of calibration processing. FIG. 25 is a diagram illustrating an example of a correction collar adjustment screen. Hereinafter, an example in which calibration is automatically performed when the objective lens is switched will be described with reference to FIGS. 23 to 25.

The control device 200 monitors an input of a switching instruction of the objective lens (step S11), and, when the switching instruction is input, retracts the drive mechanism 130 using the retraction mechanism 160 (step S12). Then, the control device 200 rotates the revolver 110 so that the selected objective lens is positioned on the observation optical axis (step S13). When the switching of the objective lens is completed, the control device 200 connects the drive mechanism 130 to the transmission mechanism 140 using the retraction mechanism 160 (step S14). Here, a case where the objective lens 120 is arranged on the observation optical axis will be described as an example.

Next, the control device 200 acquires the calibration information (step S15). Here, the control device 200 acquires first calibration information that is calibration information corresponding to the objective lens 120 placed on the observation optical axis, from among the calibration information stored in the memory 230. Specifically, for example, a calibration value corresponding to the objective lens 120 (Objective E) illustrated in FIG. 22 (angle $\alpha 1$ corresponding to the adjustment amount of 0.07 minutes) is read from the memory 230. Processing performed in step S15 is an example of first processing of the motorized correction collar system 1.

Then, the control device 200 executes calibration processing illustrated in FIG. 24 (step S16). Calibration processing is processing of calibrating the correction collar of the objective lens 120 based on the calibration information acquired in step S15, and is an example of second processing of the motorized correction collar system 1.

In calibration processing, the control device 200 first controls the motor 131 until the sensor 150 detects the reference position (step S21, step S22, and step S23). That is, the control device 200 first starts the rotation of the correction collar ring 121 (step S21), monitors the detection of the reference position by the sensor 150 (step S22), and stops the rotation of the correction collar ring 121 when the reference position is detected (step S23). Finally, the control device 200 rotates the correction collar ring 121 by the misalignment amount identified based on the calibration information (step S24). That is, the correction collar ring 121 is rotated by the calibration value (al).

After the completion of the calibration, the user may further adjust the correction collar, for example, on the window 213 illustrated in FIG. 25, while viewing an image acquired by the microscope 100. Since the misalignment between the correction collar position recognized by the motorized correction collar system 1 and the actual correction collar position has been eliminated by the calibration, the motorized correction collar system 1 can accurately move the correction collar to the position designated by the user on the window 213.

In calibration processing described above, the first processing (steps S21 to S23) corresponds to processing performed in step S6 of FIG. 14, and the second processing (step S24) corresponds to processing performed in step S7 of FIG. 14. That is, the motorized correction collar system 1 can automatically perform the calibration work manually done when creating the calibration information, using the calibration information by executing processing of FIG. 23. In addition, the motorized correction collar system 1 can execute calibration processing so as to optimize the processing for an objective lens to be used by using the calibration information created for each (type of) objective lens. For this reason, the correction collar can be accurately calibrated regardless of the objective lens to be used.

Therefore, the motorized correction collar system 1 can use any objective lens that is not limited to a specifically designed objective lens, and can perform the calibration on the correction collar of any objective lens.

Second Embodiment

In the first embodiment, an example in which the correction collar is moved to its origin position using the reference position of the transmission mechanism 140 has been described. The second embodiment is different in that the correction collar is moved to the origin position (for example, the correction collar position corresponding to 0.17 mm) without using the reference position of the transmission mechanism 140 during the calibration.

Figure 26:
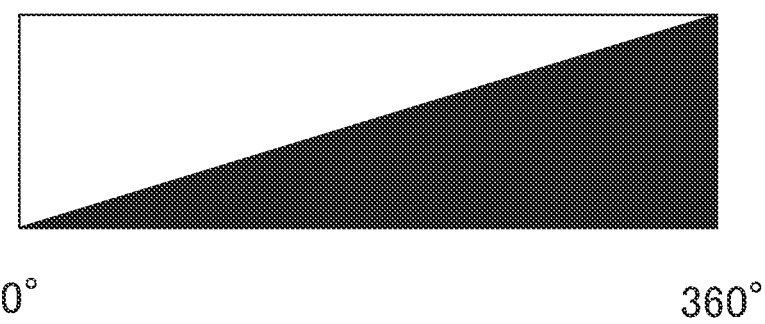
FIG. 26 is a diagram illustrating another example of an index affixed to the rotation base.
Figure 27:
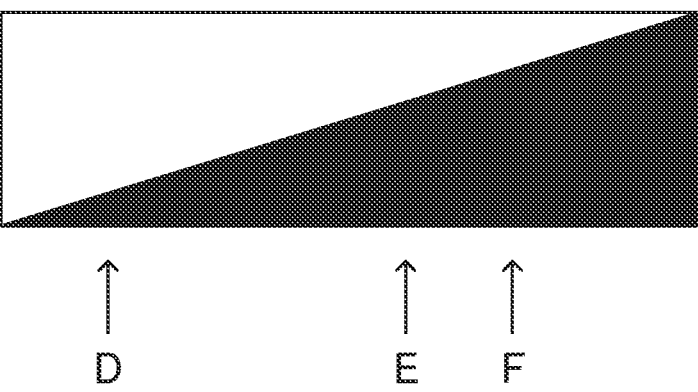
FIG. 27 is a diagram illustrating a position in the index detected by a sensor when the correction collar is at a specific position for each objective lens.
Figures 28, 29:
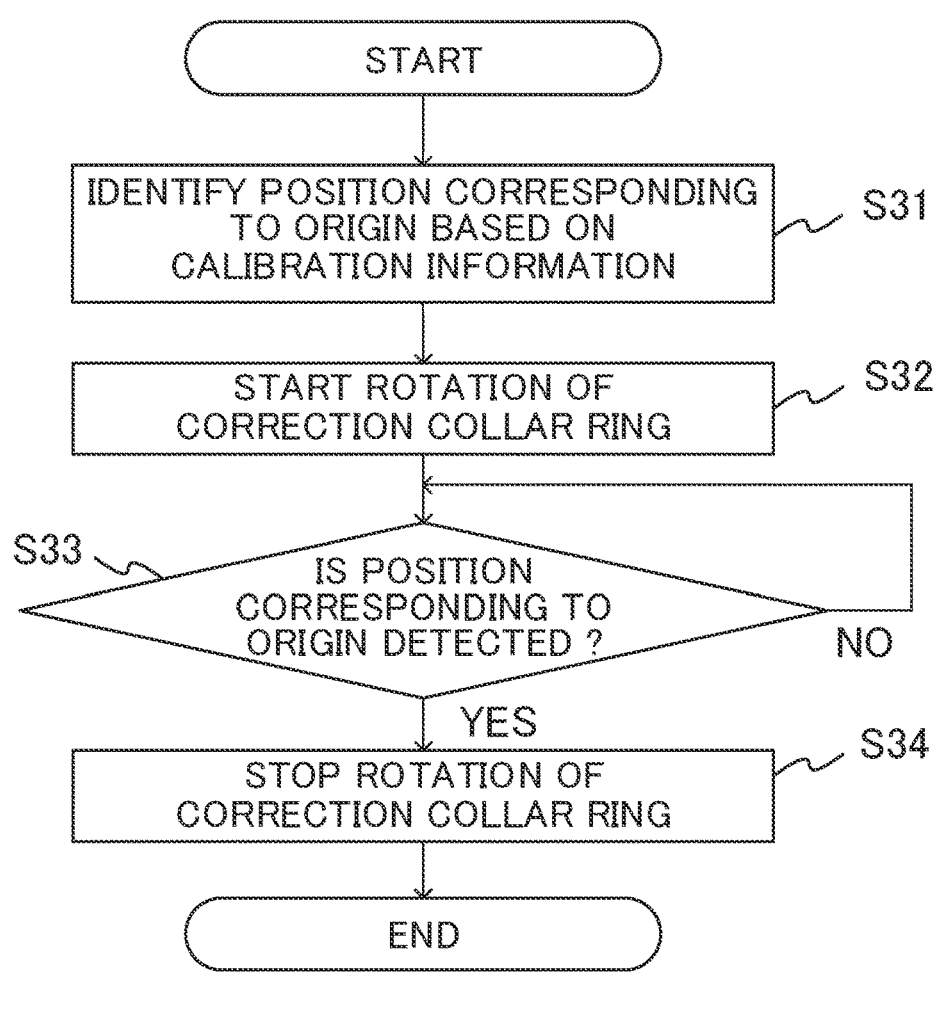
FIG. 28 is another example of the flowchart of calibration processing.
FIG. 29 is a diagram illustrating another example of the registration state of the calibration information.

FIG. 26 is a diagram illustrating another example of an index affixed to the rotation base. FIG. 27 is a diagram illustrating a position in the index detected by a sensor when the correction collar is at a specific position for each objective lens. FIG. 28 is another example of a flowchart of calibration processing. Hereinafter, the present embodiment in which the correction collar is moved to the origin position without using the reference position will be described with reference to FIGS. 26 to 28.

The motorized correction collar system according to the present embodiment is different from the motorized correction collar system 1 in that an index 20 illustrated in FIG. 26 is affixed to the rotation base 141, instead of the index 10. The index 20 is a belt-shaped index whose height changes with respect to the rotation direction. Any index 20 may be used as long as it has a different characteristic depending on each position provided on the rotation base 141, and the detection result by the sensor 150 is different depending on the orientation of the rotation base 141, while the detection result functions as position information (orientation information) of the rotation base 141. In this case, the sensor 150 detects any position of the transmission mechanism 140 instead of detecting the reference position of the transmission mechanism 140. When the calibration information is created, any position in the index 20 may be used as the reference position.

In the present embodiment, when the calibration information is created, information on the position of the transmission mechanism 140 detected by the sensor 150 after the adjustment, that is, the position in the index 20 corresponding to the origin position of the correction collar, instead of the adjustment amount, is stored as the calibration information in step S8 of FIG. 14. FIG. 27 illustrates an example in which calibration information of three types of objective lenses (Objectives D, E, and F) is stored as the information on the position in the index 20.

In the present embodiment, the control device 200 performs calibration processing of FIG. 28 instead of calibration processing of FIG. 24. First, the control device 200 identifies a position corresponding to the origin position (hereinafter referred to as a position corresponding to the origin) based on the calibration information (step S31). Then, the control device 200 starts the rotation of the correction collar ring 121 (step S32), monitors the detection of the position corresponding to the origin by the sensor 150 (step S33), and stops the rotation of the correction collar ring 121 when the position corresponding to the origin is detected (step S34). That is, the control device 200 controls the motor 131 until the position of the transmission mechanism 140 corresponding to the origin position identified based on the calibration information is detected.

In the motorized correction collar system according to the present embodiment, any objective lens that is not limited to the specifically designed objective lens can be used and the calibration can be performed on the correction collar of any objective lens, as in the motorized correction collar system 1.

Third Embodiment

FIG. 29 is a diagram illustrating another example of the registration state of the calibration information. In the first embodiment, an example in which only one piece of calibration information is stored for each type of objective lens with the correction collar has been described; however, a plurality of pieces of calibration information may be stored for each type of objective lens with the correction collar.

As illustrated in FIG. 29, the present embodiment is different from the first embodiment in that the calibration information is stored for each type of objective lens with the correction collar as well as for each environmental temperature when the objective lens is used. In this example, calibration information corresponding to two temperatures of 23° C. and 37° C. is stored, but calibration information corresponding to three or more temperatures may be stored.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, the calibration can be accurately performed under various temperature environments by selectively using the calibration information according to the environmental temperature even when the state of the motorized correction collar mechanism 100a changes due to the influence such as expansion and contraction.

Fourth Embodiment

FIG. 30 is a diagram illustrating further another example of the registration state of the calibration information. In the first embodiment, an example in which the correction collar is calibrated to the origin position determined regardless of a container has been described; however, the origin position of the correction collar may be determined for each container.

When a glass bottom dish having a thin bottom surface is used, the correction collar is usually set to a correction collar position of 0.17 mm. However, when a plastic bottom dish having a thick bottom surface is used, the correction collar is set to a correction collar position larger than 0.17 mm (for example, 1 mm). To deal with this, in the present embodiment, the calibration information is stored for each type of objective lens with the correction collar as well as for each type of container when the objective lens is used, considering such a difference in the settings of the correction collar depending on the container, as illustrated in FIG. 30. That is, the origin position is determined for each container. The present embodiment is the same as the third embodiment in that a plurality of pieces of calibration information is stored for each type of objective lens with the correction collar.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, the correction collar can be adjusted to the origin position corresponding to the container by the calibration. Therefore, the user can omit the operation of adjusting the correction collar position according to the container after the calibration even when various containers are used.

Fifth Embodiment

Figure 31:
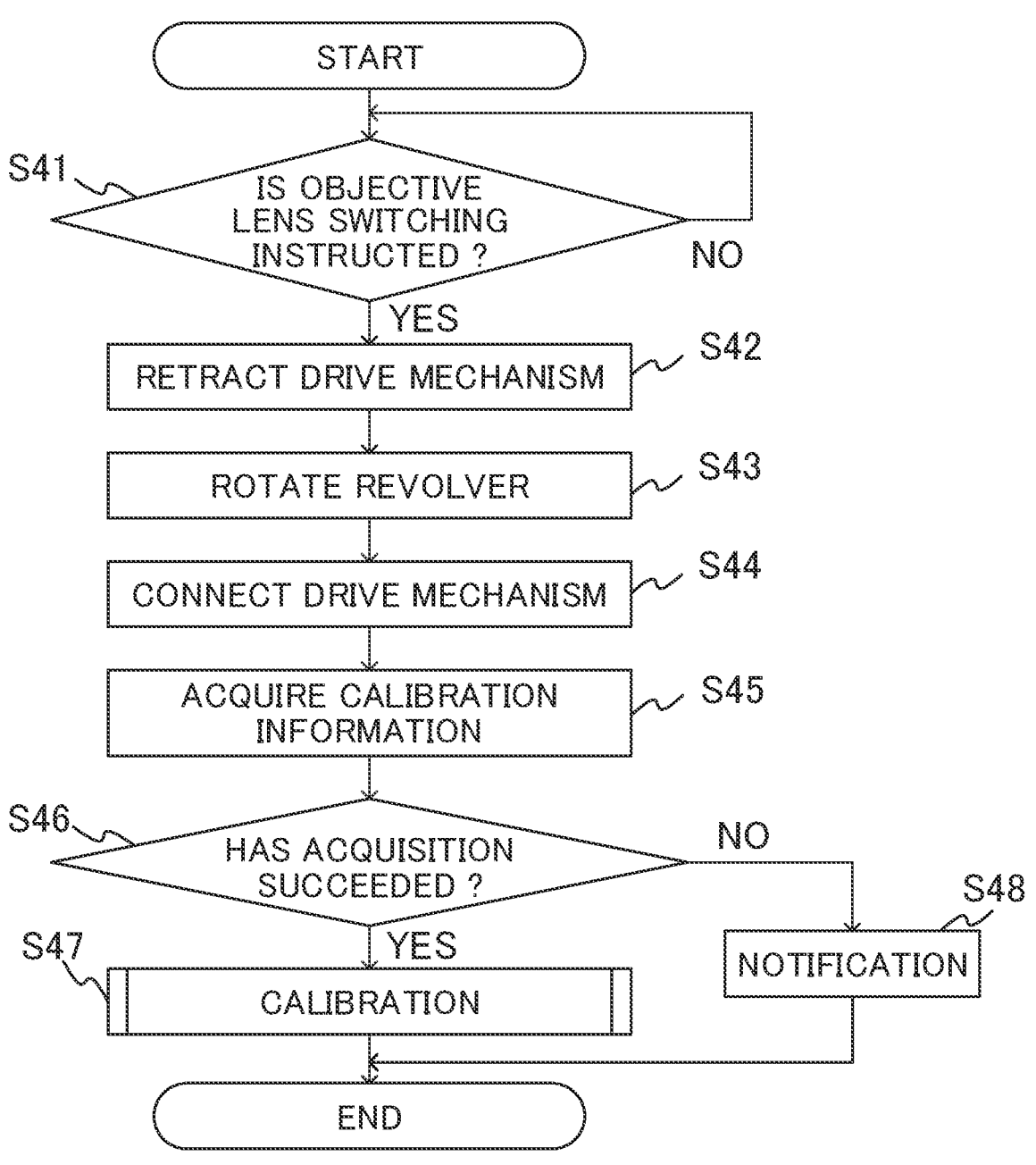
FIG. 31 is another example of the flowchart of objective lens switching processing.

FIG. 31 is another example of the flowchart of objective lens switching processing. In the first embodiment, the description has been given on the assumption that the calibration information is already created when the motorized correction collar system 1 performs the calibration; however, a situation in which the objective lens with the correction collar is used before the calibration information is created may occur.

To deal with this, the motorized correction collar system according to the present embodiment executes objective lens switching processing of FIG. 31 instead of objective lens switching processing of FIG. 23. In objective lens switching processing illustrated in FIG. 31, after executing processing of acquiring the calibration information in step S45, the control device 200 determines whether the acquisition of the calibration information has succeeded (step S46). Then, if the acquisition of the calibration information has failed, a notification that the calibration information of the objective lens to be used after switching has not been stored in the memory 230 is given (step S47). The notification method is not particularly limited, but for example, the notification may be performed by displaying information on the display device 210. That is, the display device 210 may function as a notification unit. This makes it possible to prompt the user to create the calibration information.

Processing in steps S41 to S44 and step S47 is the same as processing in steps S11 to S14 and step S16 in FIG. 23, respectively.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, it is possible to prevent the user from continuing the work while erroneously recognizing that the calibration has been performed even if the calibration information has not been created because the user is notified of the fact.

Sixth Embodiment

FIG. 32 is a diagram illustrating an example of a registration state of the calibration information and movable range information. In the fifth embodiment, an example in which the user is notified if the calibration information is not registered has been described; however, the user may be notified of an error in the registration information. The motorized correction collar system according to the present embodiment is the same as the motorized correction collar system according to the fifth embodiment in the other aspects.

The thickness of the container or cover glass that can be covered by the objective lens with the correction collar varies, for example, from 0 mm to 2 mm, from 0 mm to 1.6 mm, from 0.1 mm to 1.3 mm, and the like. In addition, in the objective lenses that can cover the same thickness range, the angular range in which the correction collar ring can rotate (hereinafter referred to as a movable range) may be different. That is, the movable range of the correction collar ring varies depending on each type of objective lens.

Figure 33:
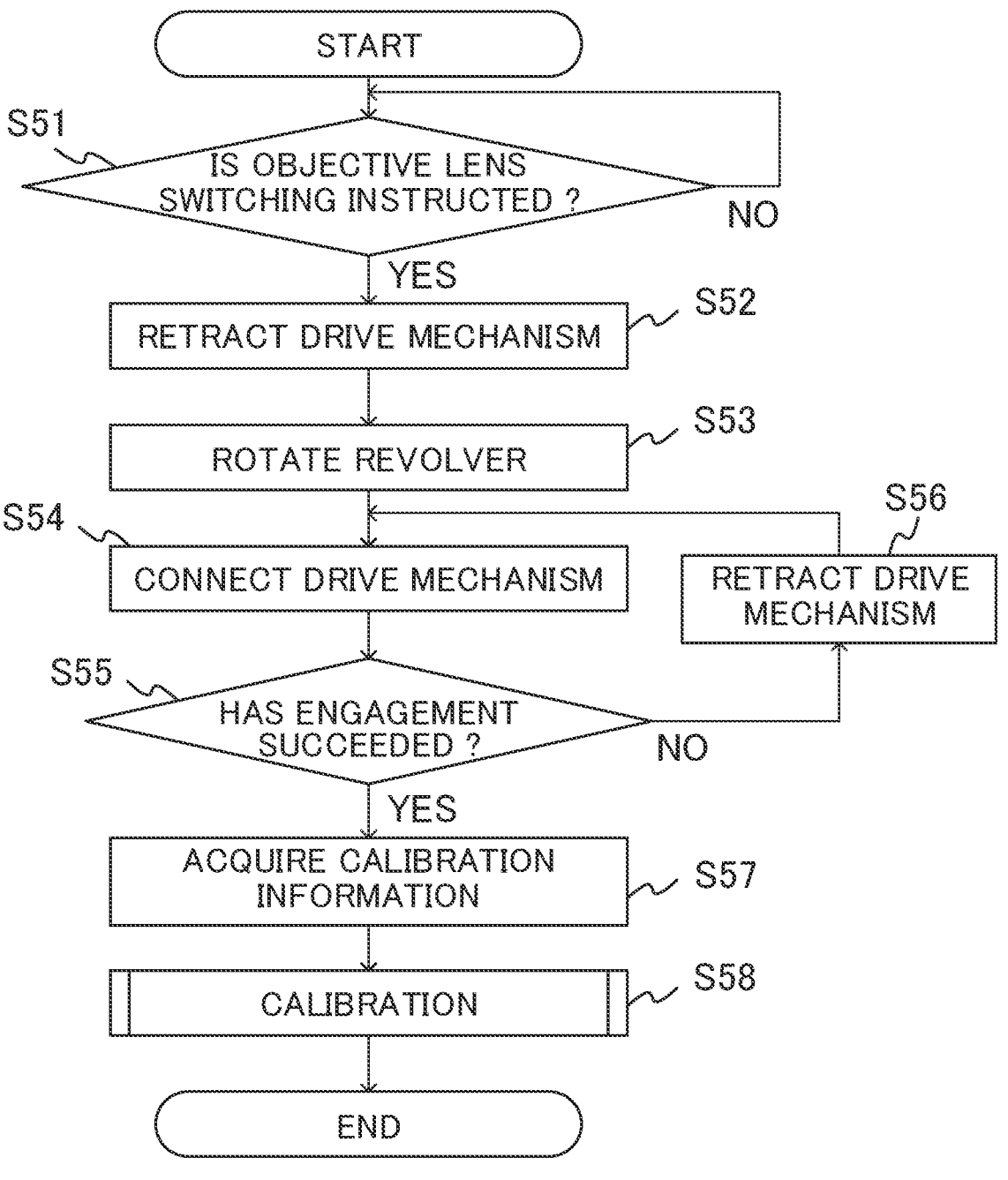
FIG. 33 is further another example of the flowchart of objective lens switching processing.

To appropriately electrically control the correction collars of various objective lenses, it is desirable, for example, that the movable range is also registered when the type of the objective lens mounted to the revolver is registered on the window 211 illustrated in FIG. 15. Therefore, for example, as illustrated in FIG. 33, the calibration information and movable range information may be registered as a set, and the control device 200 may limit the thickness that can be designated on the window 213 illustrated in FIG. 25 based on the movable range information. With this configuration, it is possible to avoid a failure of the motorized correction collar mechanism and the objective lens due to rotation beyond the movable range.

However, in this method, if the type of the objective lens is erroneously registered during the registration of the objective lens, the movable range is also erroneously registered; thus, the rotation of the correction collar ring beyond the movable range may be instructed. The control device 200 may detect and report such an error in the registration information. Specifically, when the rotation of the correction collar ring beyond the movable range is instructed, the control device 200 may detect an error in the registration information to report the error in the registration information by detecting that a force of a magnitude different from that in a normal state is applied to the motorized correction collar mechanism. In addition, when the rotation of the correction collar ring beyond the movable range is instructed, the control device 200 may detect an error in the registration information to report the error in the registration information by detecting that the correction collar ring is not rotating. Further, when the rotation of the correction collar ring beyond the movable range is instructed, the control device 200 may detect an error in the registration information to report the error in the registration information by detecting that the correction collar ring does not rotate and no change occurs in the image.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, since the registration error regarding the objective lens information can be noticed at an early stage, it is possible to prevent the user from continuing the work in an erroneous state, for example, while performing observation at an observation magnification different from the assumed magnification.

Seventh Embodiment

FIG. 33 is further another example of the flowchart of objective lens switching processing. In the first embodiment, an example in which the calibration is performed without checking the engagement state (engagement success/failure) between the drive mechanism 130 and the transmission mechanism 140 has been described; however, the calibration may be performed after checking the engagement state in advance.

The motorized correction collar system according to the present embodiment executes objective lens switching processing of FIG. 33 instead of objective lens switching processing of FIG. 23. In objective lens switching processing illustrated in FIG. 33, the control device 200, upon receipt of the objective lens switching instruction in step S51, retracts the drive mechanism 130 using the retraction mechanism 160 before the revolver 110 rotates in step S53 (step S52), and returns the drive mechanism 130 using the retraction mechanism 160 and connects the drive mechanism 130 to the transmission mechanism 140 after the revolver 110 rotates in step S53 (step S54). This process is the same as objective lens switching processing of FIG. 23.

Then, the control device 200 determines whether or not the engagement between the drive mechanism 130 and the transmission mechanism 140 has succeeded through return processing in step S54 (step S55). Specifically, the control device 200 determines whether or not the engagement has succeeded based on the detection result by the sensor 170. Then, when it is determined that the engagement has failed, retraction processing and return (connection) processing of the drive mechanism 130 are performed again (step S56 and step S54). With this configuration, the calibration can be performed in a state in which the drive mechanism 130 and the transmission mechanism 140 are reliably engaged.

Processing in steps S57 and S58 is the same as processing in steps S15 and S16 of FIG. 23, respectively.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, it is possible to avoid a calibration failure due to the engagement failure between the drive mechanism 130 and the transmission mechanism 140.

Eighth Embodiment

Figures 34, 35:
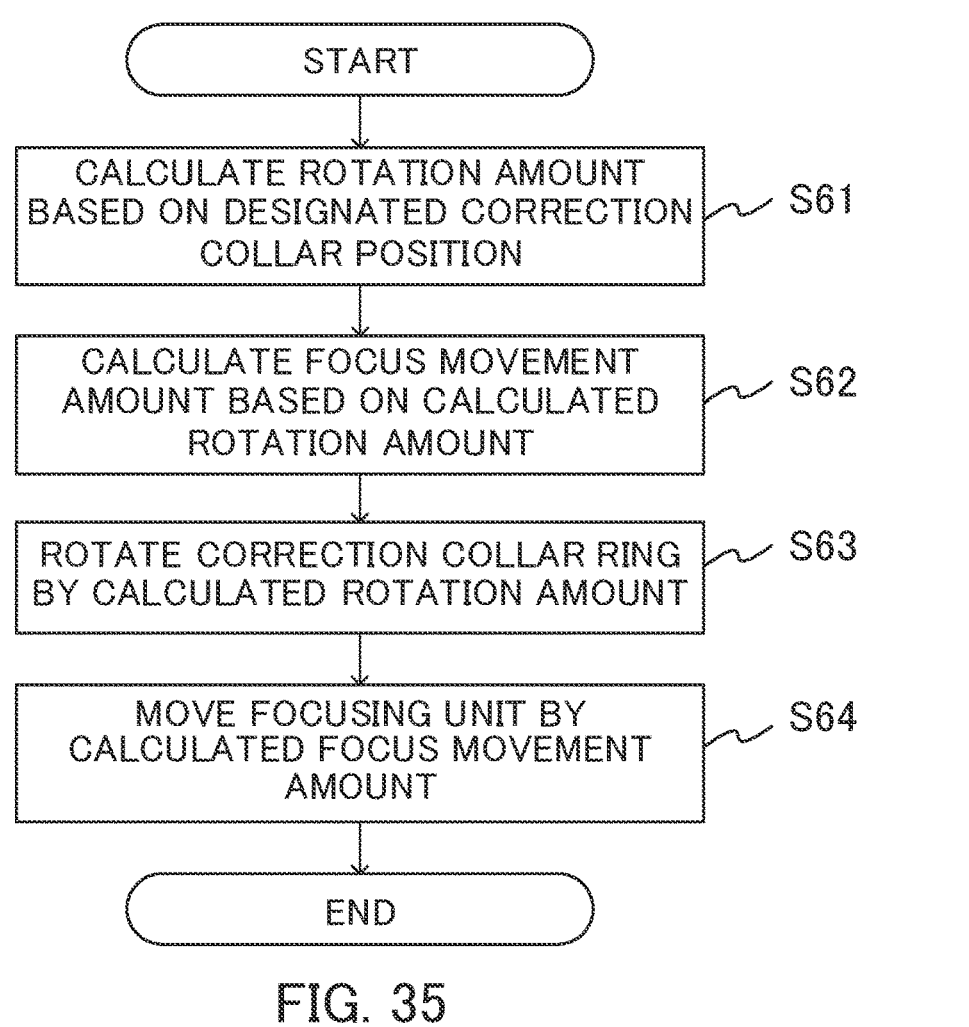
FIG. 34 is a diagram illustrating an example of a registration state of the calibration information and focus adjustment information.
FIG. 35 is an example of a flowchart of correction collar adjustment processing.

FIG. 34 is a diagram illustrating an example of a registration state of the calibration information and focus adjustment information. FIG. 35 is an example of a flowchart of correction collar adjustment processing. When the correction collar ring is rotated, a part of the lenses in the objective lens is moved, causing the focal position to be moved and resulting in defocusing. Therefore, correction collar adjustment work needs to be performed in parallel with focus adjustment work, which makes the correction collar adjustment work highly troublesome for the user.

In the present embodiment, as illustrated in FIG. 34, the memory 230 stores the focus adjustment information together with the calibration information, and the motorized correction collar system uses them to automate the focus adjustment associated with the correction collar adjustment work. A focus adjustment value illustrated in FIG. 34 is the focus adjustment information, and is information related to the relationship between the correction collar position in the objective lens and the focal length of the objective lens. More specifically, the focus adjustment information indicates the movement amount of the focal position per rotation angle of the correction collar.

In the motorized correction collar system according to the present embodiment, for example, the control device 200 executes correction collar adjustment processing of FIG. 35 when an instruction to change the correction collar position is received on the window 213 illustrated in FIG. 25 after the calibration is completed. First, the control device 200 calculates the rotation amount of the correction collar ring 121 based on the designated correction collar position (step S61).

Then, the control device 200 calculates the focus movement amount based on the rotation amount calculated in step S61 (step S62). Here, the control device 200 acquires focus adjustment information corresponding to the objective lens 120 in use from among the focus adjustment information stored in the memory 230 illustrated in FIG. 34. The focus movement amount is calculated based on the acquired focus adjustment information and the calculated rotation amount. Further, the control device 200 rotates the correction collar ring 121 by the rotation amount calculated in step S61 to adjust the correction collar (step S63). Finally, the control device 200 moves the focusing mechanism 100b by the focus movement amount calculated in step S62 to adjust the focus (step S64). That is, the control device 200 controls the focusing mechanism 100b so as to change the distance between the stage and the revolver 110 based on the focus movement amount calculated from the rotation amount of the correction collar ring 121 and the focus adjustment information. The mechanism of the focusing mechanism 100b is not particularly limited as long as it can change the distance between the stage and the revolver 110, and may be configured such that the stage can be moved in the optical axis direction of the objective lens or the revolver 110 can be moved in the optical axis direction of the objective lens. A configuration such that both the stage and the revolver 110 can be moved in the optical axis direction of the objective lens may also be used. Although an example in which the movement amount of the focal position per rotation angle of the correction collar is stored as the focus adjustment information has been described, there is an objective lens in which the rotation amount of the correction collar and the movement amount of the focal position are not in a linear relationship. In this case, the movement amount (position) of the focusing unit with respect to the absolute position of the correction collar may be stored in a one-to-one relationship, instead of the rotation amount of the correction collar. The absolute position and the movement amount may be stored, for example, in a tabular form.

In the motorized correction collar system according to the present embodiment, any objective lens that is not limited to the specifically designed objective lens can be used and the calibration can be performed on the correction collar of any objective lens, as in the motorized correction collar system 1. Further, in the motorized correction collar system according to the present embodiment, the focus adjustment associated with the correction collar adjustment work can be automated by using the focus adjustment information.

Figure 36:
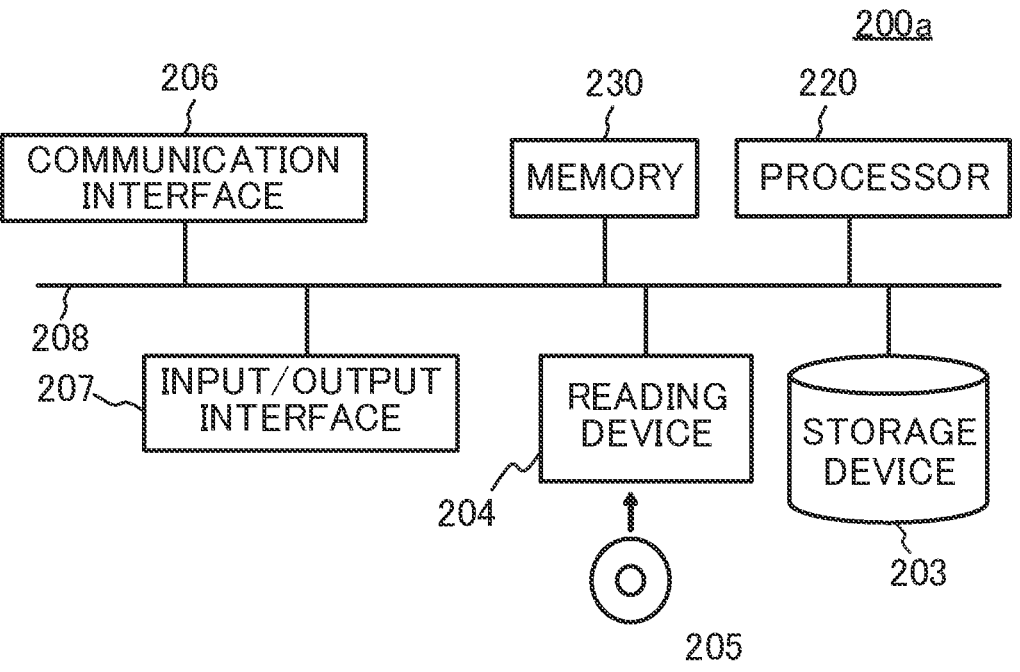
FIG. 36 is a diagram illustrating a hardware configuration of a computer for achieving a control device.

FIG. 36 illustrates an exemplary hardware configuration of a computer 200a for achieving the control device 200 according to the embodiment described above. The hardware configuration illustrated in FIG. 36 includes, for example, a processor 220, a memory 230, a storage device 203, a reading device 204, a communication interface 206, and an input/output interface 207. Note that the processor 220, the memory 230, the storage device 203, the reading device 204, the communication interface 206, and the input/output interface 207 are connected to one another, for example, via a bus 208.

The processor 220 is an example of an electric circuit that controls the motorized correction collar mechanism and may be, for example, a single processor, a multiprocessor, or a multicore processor. The processor 220 reads out a program stored in the storage device 203 and executes the program, to execute control processing of the motorized correction collar mechanism.

For example, the memory 230 is a semiconductor memory, and may include a RAM area and a ROM area. For example, the storage device 203 is a hard disk, a semiconductor memory such as a flash memory, or an external storage device.

For example, the reading device 204 accesses a removable recording medium 205 in accordance with an instruction of the processor 220. For example, the removable recording medium 205 is achieved by a semiconductor device, a medium to/from which information is input/output by a magnetic action, a medium to/from which information is input/output by an optical action. Note that, for example, the semiconductor device is a universal serial bus (USB) memory. Further, the medium from/to which information is input/output by the magnetic action is, for example, a magnetic disk. The medium from/to which information is input/output by the optical action is, for example, a compact disc (CD)-ROM, a digital versatile disk (DVD), or a Blu-ray disc (Blu-ray is a registered trademark).

The communication interface 206 communicates with other devices, for example, in accordance with the instruction of the processor 220. The input/output interface 207 is an interface, for example, between an input device and the display device 210.

For example, the program to be executed by the processor 220 is provided to the computer in the following forms:

(1) Installed in the storage device 203 in advance
(2) Provided by the removable recording medium 205
(3) Provided from a server such as a program server It should be noted that the hardware configuration of the computer for achieving the control device 200, described with reference to FIG. 36, is exemplary and thus embodiments are not limited to this. For example, the above-mentioned configuration may be partially deleted, or a new constituent may be added thereto. In another embodiment, for example, part or the entirety of the function of the control device 200 described above may be implemented as a hardware circuit by a field programmable gate array (FPGA), a system-on-a-chip (SoC), an application specific integrated circuit (ASIC), or a programmable logic device (PLD).

The embodiments described above are specific examples for facilitating understanding of the invention, and thus the present invention is not limited to the embodiments. Modifications obtained by modifying the above embodiments and alternative forms replacing the above embodiments can be included. In other words, in each embodiment, the components can be modified without departing from the spirit and the scope thereof. Further, a new embodiment can be implemented by appropriately combining the multiple components disclosed in one or more of the embodiments. Further, some components may be omitted from the components described in each embodiment, or some components may be added to the components described in the embodiment. Further, the order of the processing procedures in each embodiment is interchangeable as long as there is no contradiction. That is, the motorized correction collar system, the method of the correction collar calibration performed by the motorized correction collar system, and the computer-readable medium according to the present invention can be variously modified or altered without departing from the scope of the claims.

In the above-described embodiment, an example in which the transmission mechanism 140 includes the rotation base 141 and the objective lens attachment 142 has been described; however, if the rotation base 141 has a shape capable of directly engaging with the objective lens, the objective lens attachment 142 may be omitted.

In the above-described embodiment, an example in which the rotation base 141 is fixed to the revolver 110 has been described; however, the rotation base 141 as well as the objective lens 120 may be detachable from the revolver 110.

Although not particularly mentioned in the above-described embodiment, information regarding the movable range of the correction collar of the objective lens may be stored together with the calibration information for each objective lens with the correction collar. Using the information regarding the movable range can prevent the adjustment of the correction collar beyond the movable range and avoid a failure of the correction collar.

Although not particularly mentioned in the above-described embodiment, the gear may be slightly rotated in the opposite direction after the rotation of the correction collar ring to release the force applied to the screw thread of the correction collar ring and the gear portion 141*a* of the rotation base 141. This can suppress a visual field deviation caused by the force applied to the objective lens during the rotation of the correction collar ring.

In the above-described embodiment, an example in which the gear is mainly used for force transmission has been described; however, force may be transmitted by engagement or friction of a belt.

In the above-described embodiment, the belt-shaped index 20 whose height changes with respect to the rotation direction is exemplified as the index that changes the detection result by the sensor 150 depending on the orientation of the rotation base 141; however, a belt-shaped index having gradation whose density changes with respect to the rotation direction may be used.

In the above-described embodiment, the belt-shaped index 20 whose height changes with respect to the rotation direction is exemplified as the index that changes the detection result by the sensor 150 depending on the orientation of the rotation base 141; however, a belt-shaped index having gradation whose density changes with respect to the rotation direction may be used.

In the above-described embodiment, the movement amount of the focusing mechanism per rotation amount of the correction collar is exemplified as the focus adjustment information; however, the movement amount of the focusing mechanism corresponding to a combination of any two correction collar positions may be stored as the focus adjustment information. The movement amount corresponding to the combination of the correction collar positions can be identified by moving the focusing mechanism at each correction collar position and detecting a focused state while viewing the contrast of the image or the like.

In the above-described embodiment, an example in which the calibration is performed when the objective lens is switched has been described; however, the calibration may be performed at other timings. Since the objective lens to be used is explicitly selected by the user when the objective lens is switched, the calibration can be correctly performed by using the calibration information of the selected objective lens. However, when the calibration is performed at other timings, it may be difficult to determine calibration information to be used. Therefore, the motorized correction collar system may further include an identification unit that acquires identification information for identifying the objective lens arranged on the observation optical axis. The control device 200 may determine the calibration information to be read from the memory 230 based on the identification information acquired by the identification unit.

Herein, the expression of "based on A" does not indicate "based only on A", but indicates "based on at least A", and further indicates "based partially on at least A". That is, "based on A" may indicate "based on B in addition to A" and "based on a part of A".

Herein, the terms "first", "second", and the like that modify a noun do not limit the amount or order of an element represented by the noun. These terms are used to distinguish between two or more elements, and are nothing more nor less than it. Therefore, specifying "first" and "second" elements does not mean that the "first" element precedes the "second" element, nor does it negate the existence of a "third" element.

What is claimed is:

1. A motorized correction collar system comprising:

an attachment portion configured to accept one or more objective lenses with correction collar rings, the objective lenses comprising respective types of objective lenses;

a drive mechanism configured to rotate the correction collar rings via a transmission mechanism;

a sensor configured to detect a position of the transmission mechanism;

a memory comprising calibration information for each of the objective lenses, the calibration information comprising respective misalignment amounts between correction collar positions of the correction collar rings that correspond to a reference position of the transmission mechanism and correction collar positions of the correction collar rings that correspond to origin positions of the correction collar rings; and, a processor configured to, for an objective lens of the objective lenses that is attached to the attachment portion and located along an observation optical axis:

acquire calibration information corresponding to the objective lens based on the calibration information stored in the memory;

control the drive mechanism to rotate a correction collar ring of the objective lens until the sensor detects the reference position of the transmission mechanism; and control the drive mechanism to rotate the correction collar ring by a misalignment amount based on the calibration information corresponding to the objective lens.

2. The motorized correction collar system according to claim 1, wherein;

the transmission mechanism includes:

a grip portion coupled with the correction collar ring; and a driven portion, fixed to the attachment portion, that transmits force from the drive mechanism to the grip portion; and the sensor is configured to detect the position of the transmission mechanism based on an index provided in the driven portion.

3. The motorized correction collar system according to claim 2, wherein:

the driven portion includes a hollow cylindrical member that interlocks with the drive mechanism and the grip portion and surrounds an attachment hole provided in the attachment portion; and the index is provided on the hollow cylindrical member.

4. The motorized correction collar system according to claim 2, wherein:

the attachment portion is a revolver; and the motorized correction collar system further comprises a retraction mechanism configured to retract the drive mechanism from engagement with the driven portion in conjunction with a rotation of the revolver.

5. The motorized correction collar system according to claim 2, wherein:

the grip portion includes an elastic member; and the correction collar ring is coupled with the grip portion via an elastic force of the elastic member.

6. The motorized correction collar system according to claim 1, wherein the controlling the drive mechanism to rotate the correction collar ring by the misalignment amount is effective to place the correction collar ring of the objective lens in an origin position.

7. The motorized correction collar system according to claim 1, further comprising an identification unit configured to identify the objective lenses, wherein the processor is further configured to:

receive an identification of the objective lens from the identification unit; and acquire the calibration information corresponding to the objective lens based further on the identification of the objective lens.

8. The motorized correction collar system according to claim 1, further comprising:

a stage; and a focusing mechanism configured to change a distance between the stage and the attachment portion, wherein:

the memory further comprises focus adjustment information for each of the objective lenses, wherein the focus adjustment information comprises respective relationships between correction collar positions of the correction collar rings and focal lengths of the objective lenses; and the processor is further configured to:

acquire focus adjustment information corresponding to the objective lens based on the focus adjustment information stored in the memory; and control the focusing mechanism based on a rotation amount of the correction collar ring of the objective lens and the focus adjustment information corresponding to the objective lens.

9. The motorized correction collar system according to claim 1, further comprising a notification unit configured to report, for another objective lens that is attached to the attachment portion and located along the observation optical axis that does not have calibration information corresponding thereto, that calibration information corresponding to the other objective lens is not stored in the memory.

10. A method of adjusting a correction collar ring of an objective lens performed by a motorized correction collar system that includes the objective lens, the method comprising:

acquiring calibration information corresponding to the objective lens from calibration information stored for each of one or more types of objective lenses with correction collar rings, the calibration information comprising respective misalignment amounts between correction collar positions of the correction collar rings that correspond to a reference position of a transmission mechanism of the motorized correction collar system and correction collar positions of the correction collar rings that correspond to origin positions of the correction collar rings;

controlling a drive mechanism of the motorized correction collar system to rotate the correction collar ring of the objective lens until a sensor of the motorized correction collar system detects the reference position of the transmission mechanism; and controlling the drive mechanism to rotate the correction collar ring of the objective lens by a misalignment amount based on the calibration information corresponding to the objective lens.

11. A non-transitory computer-readable medium storing instructions that, when executed by at least one processor, cause a motorized correction collar system to:

acquire calibration information corresponding to an objective lens of the motorized correction collar system from calibration information stored for each of one or more types of objective lenses with correction collar rings, the calibration information comprising respective misalignment amounts between correction collar positions of the correction collar rings that correspond to a reference position of a transmission mechanism of the motorized correction collar system and correction collar positions of the correction collar rings that correspond to origin positions of the correction collar rings;

control a drive mechanism of the motorized correction collar system to rotate a correction collar ring of the objective lens until a sensor of the motorized correction collar system detects the reference position of the transmission mechanism; and control the drive mechanism to rotate the correction collar ring by a misalignment amount based on the calibration information corresponding to the objective lens.

* * * * *